US008291573B2

(12) United States Patent
Tokizawa

(10) Patent No.: US 8,291,573 B2
(45) Date of Patent: Oct. 23, 2012

(54) STATOR WITH WINDING FORMED OF A SERIES OF SEGMENTS FOR ELECTRIC ROTATING MACHINE AND METHOD OF MANUFACTURING THE STATOR

(75) Inventor: Takashi Tokizawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/926,103

(22) Filed: Oct. 26, 2010

(65) Prior Publication Data
US 2011/0041320 A1 Feb. 24, 2011

Related U.S. Application Data

(62) Division of application No. 12/068,669, filed on Feb. 8, 2008, now Pat. No. 7,847,465.

(30) Foreign Application Priority Data

Feb. 9, 2007 (JP) ................................. 2007-031167

(51) Int. Cl.
H02K 15/00 (2006.01)
(52) U.S. Cl. .............. 29/596; 29/606; 29/609; 310/201; 310/179
(58) Field of Classification Search .................... 29/596, 29/606, 607, 609; 310/201, 179, 181, 180, 310/184, 194, 195, 198
See application file for complete search history.

(56) References Cited

U.S. PATENT DOCUMENTS

| | | | |
|---|---|---|---|
| 1,597,544 A * | 8/1926 | Rodenhausen | 298/11 |
| 5,965,965 A | 10/1999 | Umeda et al. | |
| 6,249,956 B1 | 6/2001 | Maeda et al. | |
| 6,403,921 B1 | 6/2002 | Maeda et al. | |
| 6,462,453 B1 * | 10/2002 | Asao et al. | 310/179 |
| 6,490,779 B1 | 12/2002 | Tokizawa et al. | |
| 6,530,140 B2 | 3/2003 | Maeda et al. | |
| 6,557,239 B2 | 5/2003 | Takahashi et al. | |
| 6,694,598 B2 | 2/2004 | Takahashi et al. | |
| 6,698,083 B2 | 3/2004 | Tokizawa et al. | |

(Continued)

FOREIGN PATENT DOCUMENTS

| | | |
|---|---|---|
| JP | A-2000-350421 | 12/2000 |
| JP | A-2001-197709 | 7/2001 |
| JP | A-2004-254362 | 9/2004 |
| JP | A-2004-328861 | 11/2004 |
| JP | A-2006-333562 | 12/2006 |
| WO | WO 99/21267 A1 | 4/1999 |

OTHER PUBLICATIONS

Notification of Reasons for Rejection for Japanese Patent Application No. 2007-031167, issued Dec. 22, 2008. Feb. 23, 2010 Restriction Requirement issued in U.S. Appl. No. 12/068,669.
Jun. 2, 2010 Office Action issued in U.S. Appl. No. 12/068,669.

Primary Examiner — Derris Banks
Assistant Examiner — Jeffrey T Carley
(74) Attorney, Agent, or Firm — Oliff & Berridge, PLC

(57) ABSTRACT

A stator has conductor segments serially wound on a core. Each segment inserted in one of slots of the core has a slanting portion protruding from the slot and inclined toward circumferential and axial directions of the core. Each slanting portion has an oblique portion with a film removal surface and a film removal portion with a film removed surface to have a slanting removal area covered with no insulation film and extending on the oblique portion. Each film removal portion has a connection portion on an end thereof. The connection portions are aligned along a radial direction of the core to form a plurality of end pairs. The connection portions of each end pair are connected with each other so as to serially connect the segments with one another.

3 Claims, 13 Drawing Sheets

U.S. PATENT DOCUMENTS

| | | |
|---|---|---|
| 6,836,046 B2 | 12/2004 | Gorohata et al. |
| 6,865,796 B1 * | 3/2005 | Oohashi et al. ............... 29/596 |
| 6,894,415 B2 | 5/2005 | Koike |
| 7,034,429 B2 | 4/2006 | Ichikawa et al. |
| 7,293,342 B2 | 11/2007 | Kato |
| 2002/0033649 A1 * | 3/2002 | Oohashi et al. ............... 310/184 |
| 2005/0229381 A1 | 10/2005 | Kato |
| 2006/0232157 A1 | 10/2006 | Ooiwa |
| 2006/0267440 A1 * | 11/2006 | Sakai et al. ............... 310/184 |
| 2008/0191574 A1 | 8/2008 | Tokizawa |

\* cited by examiner

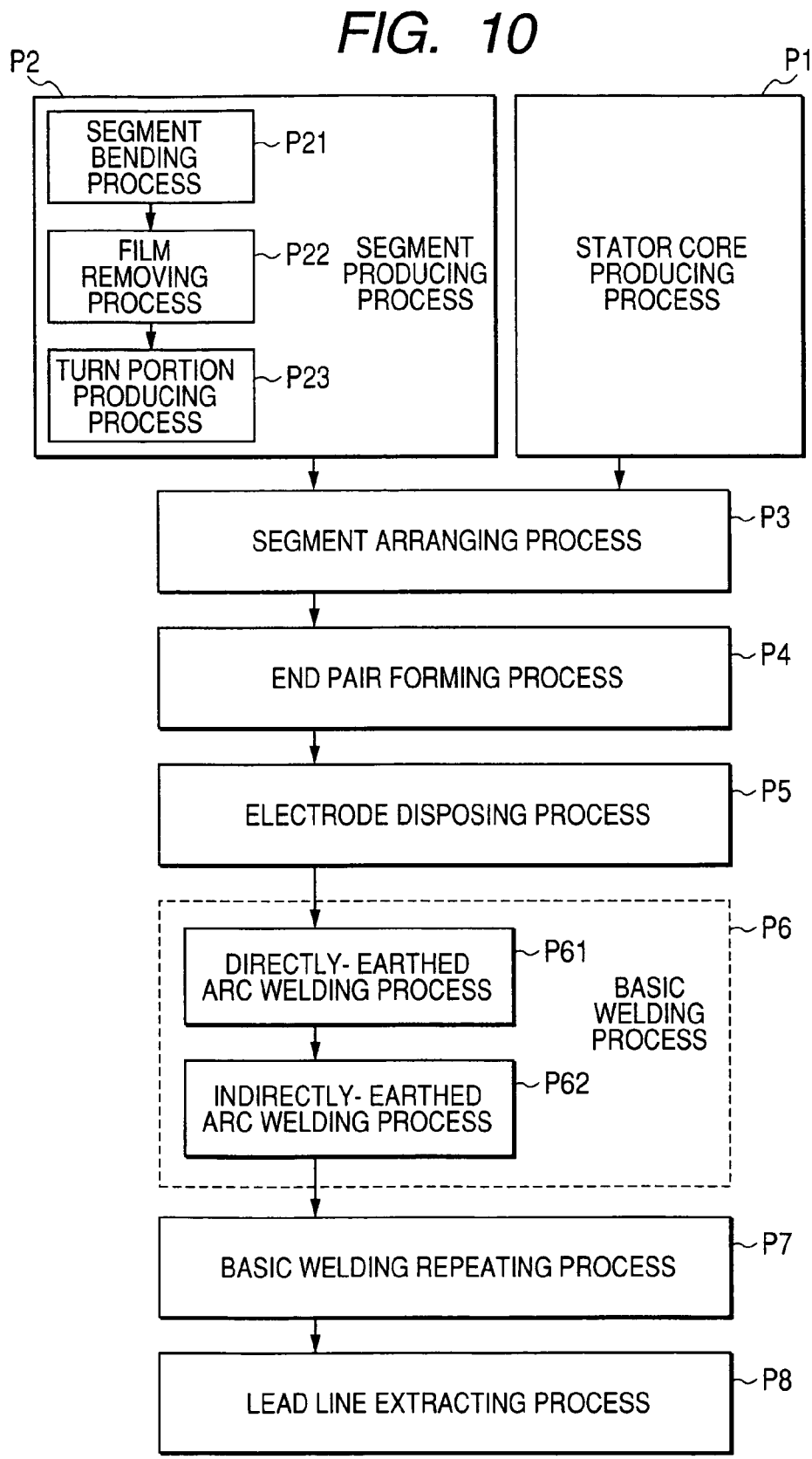

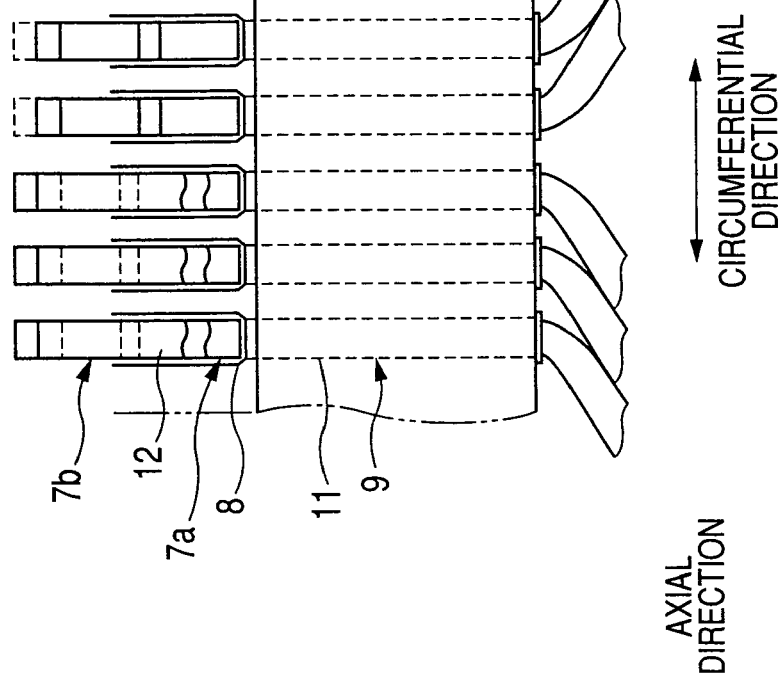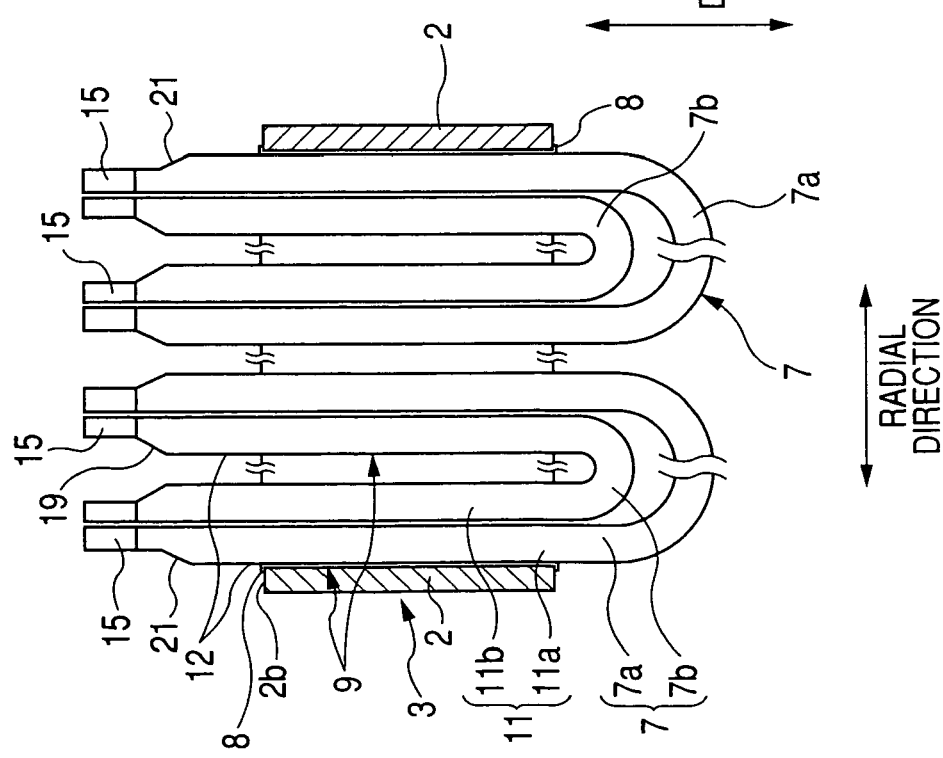

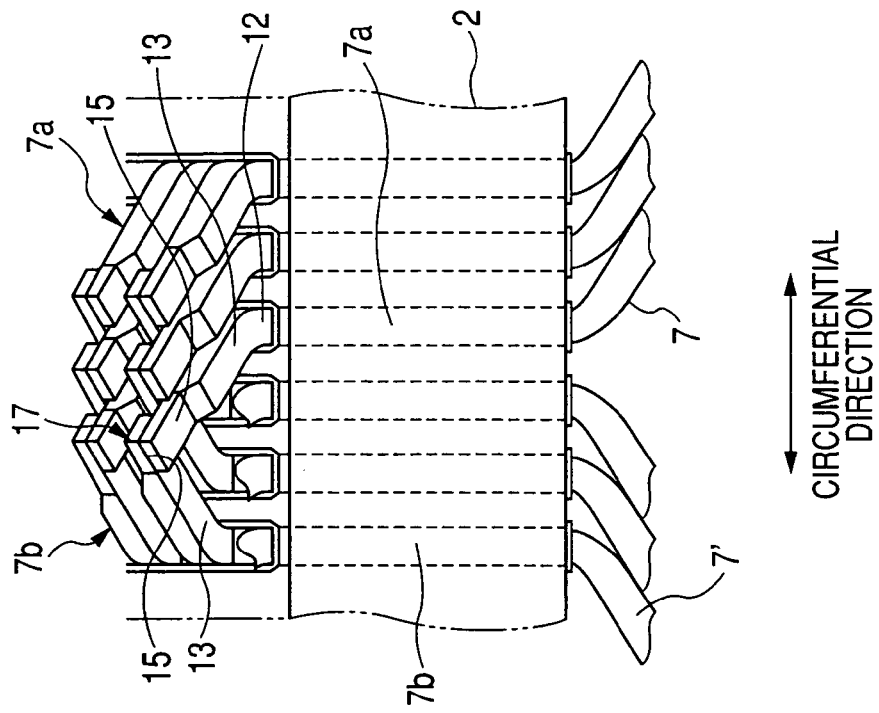
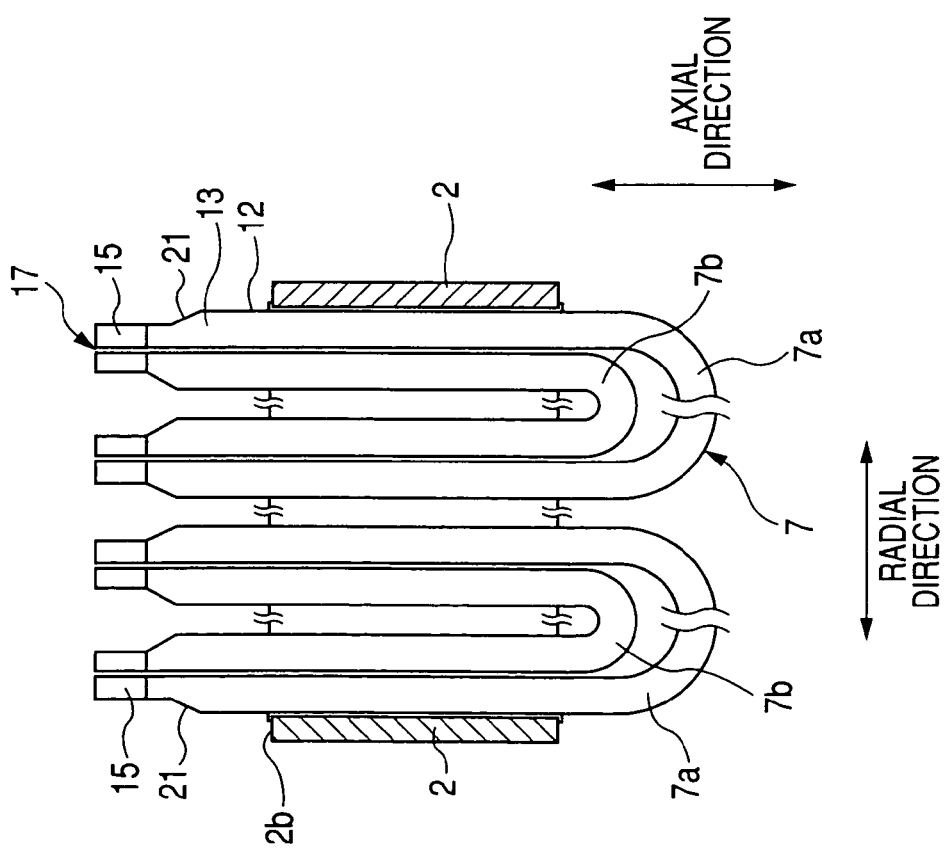
FIG. 12A
FIG. 12B

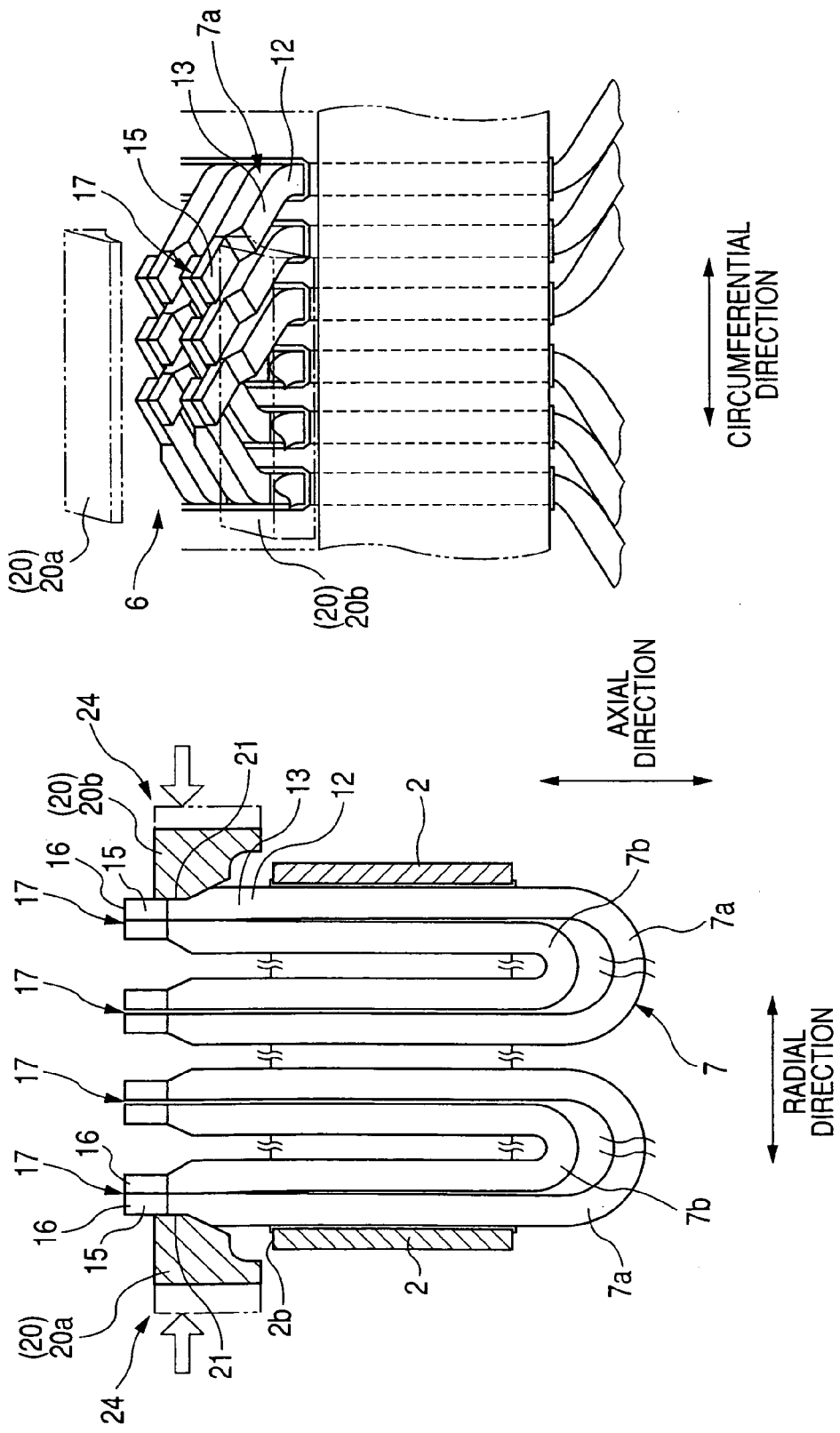

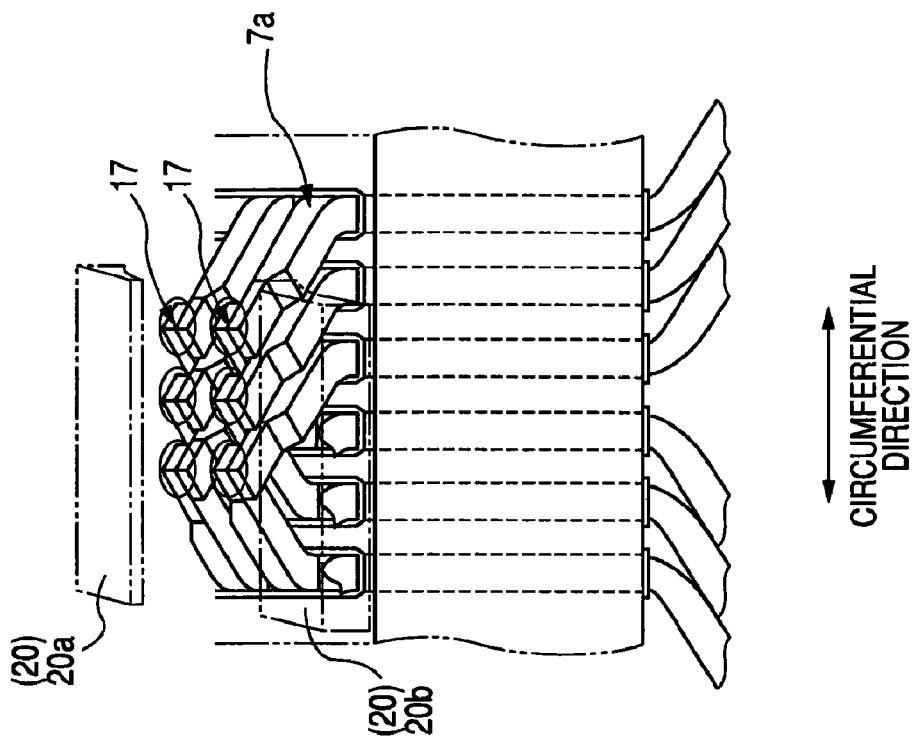
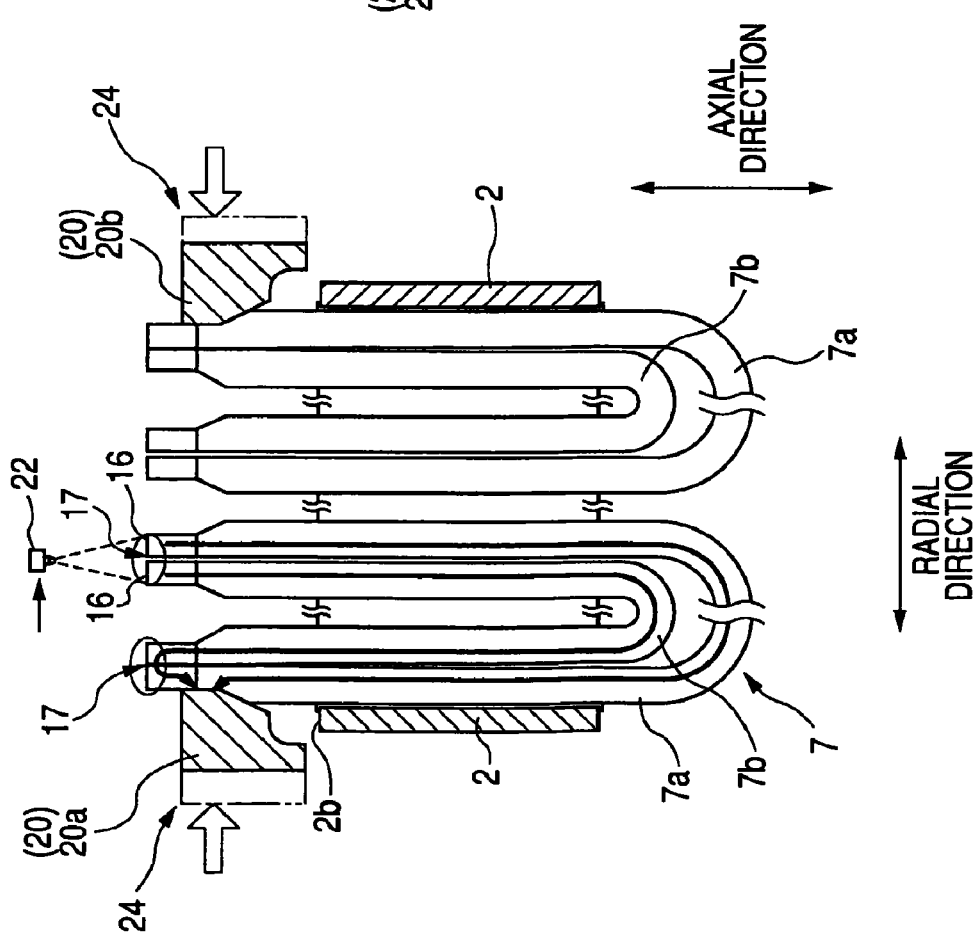
FIG. 15A
FIG. 15B

STATOR WITH WINDING FORMED OF A SERIES OF SEGMENTS FOR ELECTRIC ROTATING MACHINE AND METHOD OF MANUFACTURING THE STATOR

This is a Division of application Ser. No. 12/068,669 filed Feb. 8, 2008. The disclosure of the prior application is hereby incorporated by reference herein in its entirety.

CROSS-REFERENCE TO RELATED APPLICATION

This application is based upon and claims the benefit of priority of the prior Japanese Patent Application 2007-031167 filed on Feb. 9, 2007 so that the contents of which are incorporated herein by reference.

BACKGROUND OF THE INVENTION

1. Field of the Invention

The present invention relates generally to a stator of an electric rotating machine and a method of manufacturing the stator, and more particularly to the stator wherein a stator winding formed of a series of conductive segments is wound on a stator core.

2. Description of Related Art

An electric rotating machine such as an alternator has a stator and a rotor to generate an alternating current in the stator from a rotating force added to the rotor or to generate a rotating force in the rotor from an alternating current applied to the stator. The stator has a cylindrical stator core and a stator winding wound on the core, and the alternating current is received or generated in the winding. The rotor is rotatably disposed in a central hole of the core.

The core has a plurality of slots aligned along a circumferential direction thereof, and each slot penetrates through the core along an axial direction of the core. The winding is formed of a plurality of conductive segments inserted into the slots, and the segments are serially connected with one another to form a coil end group on an axial end side of the core. The winding is wound on the core so as to heighten a conductor occupying ratio and to compactly form the coil end groups. The ratio is defined as a ratio of an area actually occupied by the segments to a total area allowed for the winding.

Each segment is, for example, formed in a U shape so as to have two straight portions and a U-shaped head portion. To manufacture a stator having the winding wound on the core, the head portions of the segments are twisted so as to widen a span between the straight portions of each segment, the straight portions of each segment are, respectively, inserted into two slots so as to penetrate through the slots, and end portions of the segments protruded from the slots are bent and inclined toward the circumferential direction of the core to form oblique portions as a coil end group on an axial end of the core. In another technique, end portions of the segments not yet inserted into the slots are bent and deformed into oblique portions, and the straight portions of each segment are, respectively, placed into two slots such that the oblique portions are protruded from the slots as a coil end group on one axial end of the core. In these circumstances, each slot receives four straight portions of four segments aligned along a radial direction of the core to form four layers of the oblique portions along the radial direction. Ends of the oblique portions of each pair of segments inserted into different slots and disposed adjacent to each other along the radial direction are closely aligned with each other along the radial direction so as to form an end pair. Then, each end pair is connected with each other by welding to serially connect the segments with one another. Therefore, the winding composed of a series of segments is wound on the core to form a stator.

Published Japanese Patent First Publication No. 2001-197709 discloses a method of twisting a plurality of U-shaped conductive segments to produce a stator winding from the twisted segments. In this method, to obtain a stator winding of a stator used for an alternator of a vehicle, four segments are inserted into each slot of a stator core, portions of the segments protruded from the slots are twisted by using a twisting device to form oblique portions bent by the device and standing portions held by the device.

This method is described with reference to FIG. 1, FIG. 2 and FIG. 3 in more detail. FIG. 1 shows a segment set 103 to be inserted into slots 102 of a stator core 101, and FIG. 2 shows one segment set deformed by a twisting device. FIG. 3 is a perspective side view of a coil end group formed of all segment sets twisted.

As shown in FIG. 1 and FIG. 2, a stator winding is formed of a plurality of segment sets 103. Each segment set has a U-shaped larger segment 131 and a U-shaped smaller segment 132. The segment 131 is shaped so as to have a U-shaped head portion 131a, first oblique portions 131b and 131c and two straight portions. The segment 132 is shaped with the segment 131 so as to have a U-shaped head portion 132a, first oblique portions 132b and 132c and two straight portions. The four straight portions of one segment set are inserted into each pair of slots 102 away from each other by one magnetic pole pitch to place both an inserted portion 131d of the segment 131 and an inserted portion 132d of the segment 132 in one slot and to place both an inserted portion 131e of the segment 131 and an inserted portion 132e of the segment 132 in the other slot. Further, two straight portions of another segment set are inserted into each slot. Therefore, four segments form four layers aligned along a radial direction of the core 101 in each slot. Each layer extends along the circumferential direction. Then, a twisting device (not shown) holds ends of all segments 131 and 132 protruded from the slots 102 and twists the segments 131 and 132 so as to form second oblique portions 131f and 131g bent by the device, standing portions 131h and 131i held by the device, second oblique portions 132f and 132g bent by the device and standing portions 132h and 132i held by the device.

The second oblique portions 131f and 131g are inclined toward a circumferential direction by half of one magnetic pole pitch to extend away from each other, and the second oblique portions 132f and 132g are inclined toward the circumferential direction by half of one magnetic pole pitch to approach each other. Each of the standing portions 131h, 131i, 132h and 132i extends along an axial direction of the core 101 so as to stand on an axial end of the core 101. The portions 131f to 131i of the segments 131 and the portions 132f to 132i of the segments 132 form a coil end group on one axial end of the core 101.

Each of the standing portions 131h, 131i, 132h and 132i acts as a margin so as to be held by the twisting device and extends along the axial direction of the core 101 so as to stand on the core 101. As shown in FIG. 3, the standing portions 131h, 132h, 132i and 131i of the segments 131 and 132 forming an inner layer, a first middle layer, a second middle layer and an outer layer in that order are aligned along the radial direction.

Then, the standing portions 131i and 132i of each pair of segments 131 and 132 adjacent to each other along the radial direction are connected with each other by welding to form a first row extending along the circumferential direction, and the standing portions 131*h* and 132*h* of each pair of segments 131 and 132 adjacent to each other along the radial direction are connected with each other by welding to form a second row extending along the circumferential direction. Therefore, the segments 131 and 132 are serially connected with one another so as to form four layers and two rows.

In the twisting, the segments of each layer are bent and moved along the circumferential and axial directions, independently from the segments of the other layers. Accordingly, not only the segments protruded from the core 101 can be positioned in the circumferential direction for each layer, but also the segments can easily be positioned in the axial direction for each layer, independently from the positioning in the circumferential direction.

For example, in the twisting, the movement of the segments of the outer layer is larger than the movement of the segments of the inner layer. However, even when the height of portions of the segments protruded in the axial direction from the core in each layer is set before the twisting process to be the same as that in the other layers, the axial height of the segments in each layer can easily be set after the twisting process to become equal to that in the other layers. Further, the segments protruded from the core can easily be deformed for each layer in the twisting process so as to have a desired shape matching with various requirements. That is, because the standing portions in all layers have the same axial height, the standing portions adjacent to each other along the radial direction can easily be connected with each other.

Further, Published Japanese Patent First Publication No. 2000-350421 discloses a connecting method wherein end portions of conductive segments adjacent to each other along a radial direction of a stator core are connected with each other by welding to form a winding of a stator used for an alternator of a vehicle. FIG. 4 is a view of a segment connecting device in this Publication, and FIG. 5 is a view showing the connection of two end portions aligned in a pair.

As shown in FIG. 4 and FIG. 5, a stator core 114 wound by a series of U-shaped conductive segments is disposed on a board 106. Both end portions 121 of each conductive segment are deformed in the same manner as the standing portions shown in FIG. 2, so that each end portion 121 extends in the upper direction. Insulating films of the end portions 121 are removed in advance by using a cutter, chemicals or the like. Four end portions 121 are aligned along a radial direction of the core 114 to form four layers, and a plurality of end portions 121 are disposed at equal intervals along a circumferential direction of the core 114 for each layer. Two end portions 121 of the inner and first middle layers adjacent to each other along the radial direction are in contact with each other to form an end pair 113, and the end pairs 113 of the inner and first middle layers form an inner row. The two end portions of the outer and second middle layers adjacent to each other along the radial direction are in contact with each other to form another end pair 113. The end pairs 113 of the outer and second middle layers form an outer row. The two end pairs 113 aligned along the radial direction are disposed at a sufficient interval, so that the end pairs 113 can be electrically insulated from each other.

In an electrode restraining process, the end portions 121 are restricted on the core 114 by a restricting device 107 to place each end pair 113 at a predetermined position. The device 107 has an inner side electrode 110, an outer side electrode 111 and a comb-shaped electrode having a plurality of bar-shaped electrodes 112. The electrode 110 is disposed to be in contact with inner side surfaces of the end portions 121 placed in the inner layer. The electrode 111 is disposed to be in contact with outer side surfaces of the end portions 121 placed in the outer layer. The electrodes 110 and 111 restrain the end portions 121 in the radial direction. Each electrode 112 is disposed between two groups of four end portions 121 facing each other in the circumferential direction so as to be in contact with side surfaces of the eight end portions 121. The electrodes 112 restrain the end portions 121 in the circumferential direction to act as protective elements. Further, the electrodes 112 bridge a gap between the electrodes 110 and 111. A width of each electrode 112 in the circumferential direction is widened toward the outer side of the core 114, so that the electrode 112 is reliably in contact with the end portions 121.

In a directly-earthed arc welding process, a welding torch 109 of a segment connecting device 110 is moved by a robot arm 108 to be placed over a particular end pair 113 which is positioned at a welding starting position in the outer row. Then, a welding voltage is applied between the torch 109 and the restricting device 107, and an inert gas is supplied to the torch 109. Further, after the welding voltage is applied, the board 106 is rotated clockwise while a distance between the torch 2 and the device 107 is maintained. During the rotation of the board 106, the welding voltage is fixed, and the position of the torch 109 is fixed. Therefore, end portions 121 of the particular end pair 113 placed just under the torch 109 are first welded together, and end portions 121 of another end pair 113 adjacent to the welded end pair 113 are welded together. That is, the end portions 121 of the end pairs 113 in the outer row are successively welded together.

After the welding for all end pairs 113 in the outer row is completed, the torch 109 is moved to be placed over another particular end pair 113 which is positioned at a welding starting position in the inner row. Then, the end portions 121 of the end pairs 113 in the inner row are successively welded together. After one rotation of the board 106, the rotation of the board 106 is stopped, and the supply of the welding voltage and the inert gas is stopped. Further, the electrodes 110, 111 and 112 are removed. Therefore, a stator winding having a plurality of segments serially connected with one another is obtained so as to form four layers and two rows.

Assuming that the twisting method disclosed in the Publication No. 2001-197709 is combined with the connecting method disclosed in the Publication No. 2000-350421, conductive segments inserted into a stator core are twisted according to the twisting method such that segments protruded from the core in the layers have substantially the same axial height, and the twisted segments are serially connected with one another to form a stator winding. In this case, because a distance between the torch 109 and end portions 112 of the end pairs 113 becomes constant during the rotation of the core in the welding process, the connecting device 110 can weld the end portions 112 of each end pair 113 together without excessively increasing heat added to the end portions 112. Therefore, in the welding process, the heat is hardly transmitted to the second oblique portions of the segments covered with insulation films. Accordingly, heat deterioration of the insulation films covering the second oblique portions can be suppressed. Further, because the heat deterioration of the insulation films is effectively suppressed, an area of a film removal portion in each segment can be reduced. In this case, electrical insulation between end pairs 113 adjacent to each other in the radial direction can reliably be achieved, and a distance between the end pairs 113 aligned along the radial direction can be shortened. That is, a coil end group of the segments can be compactly formed in the radial direction.

Further, in the electrode restricting process, each group of four end portions 112 aligned along the radial direction can be restrained in the radial direction and circumferential directions by the electrodes 110, 111 and 112, and the end portions 113 of each end pair 113 can be earthed through the electrodes 110, 111 and 112 so as to be smoothly welded together.

Moreover, the electrodes 112 cover the second oblique portions of the segments from the torch 109 so as to shield the second oblique portions from arc discharges of the torch 109. Therefore, the electrodes 112 prevent heat of the arc discharges from being transmitted to insulation films of the second oblique portions. Further, the electrodes 112 are in contact with large side surfaces of the end portions of the segments, so that a heat dissipation area between each electrode 112 and the end portions of the segments becomes large. Accordingly, heat of the arc discharges outputted from the torch 109 can be effectively dissipated to the electrodes 112, this effective dissipation suppresses the excessive heating of the second oblique portions, and insulation films of the second oblique portions are hardly damaged by the heat of the arc discharges.

Problems in the prior art disclosed in the Publication No. 2001-197709 and the Publication No. 2000-350421 are described hereinafter.

The prior art discloses the method of producing a winding of a stator used for an alternator of a vehicle, and a series of conductive segments wound on a stator core is formed in four layers and two rows to act as a stator winding. In contrast, a traction motor for a vehicle representing an electric rotating machine has been required in recent years. This motor is required to output a larger amount of electric current set at a higher voltage, as compared with the current and voltage in the alternator. Therefore, in this traction motor, conductive segments are wound on a stator core in many layers (e.g., eight layers) and many rows (e.g., four rows) to increase the number of turns in a stator winding. In this case, to manufacture the motor in a small size, it is required to further lessen an axial height of a coil end group (i.e., portions of segments protruded from a stator core) and to compactly form the coil end group.

However, assuming that stator winding based on the prior art is used for a traction motor, it is difficult to manufacture the motor in a small size. For example, in the prior art disclosed in the Publication No. 2001-197709, it is necessary for the standing portions 31h, 31i, 32h and 32i of the segments to be held and twisted by the twisting device, and the standing portions are disposed so as to stand on a stator core toward the axial direction. Therefore, a length of a stator along the axial direction is unnecessarily increased by an axial height of the standing portions, so that the motor becomes large in size.

Further, in the prior art disclosed in the Publication No. 2000-350421, as shown in FIG. 5, because the electrodes 112 are in contact with the film removal portions 121 corresponding to the standing portions, a length of each film removal portion 121 is required to be larger than a thickness of the electrode 112. Therefore, the film removal portion 121 is undesirably lengthened.

Moreover, it is desired that the conductive segments are disposed at smaller intervals to form a stator in a smaller size. However, in this case, there is a probability that the insulation performance of the conductive segments will be degraded. Assuming that an axial length of the standing portions is increased to heighten the insulation performance, an axial height of a coil end group is further increased, so that a stator further becomes large in the axial direction.

In recent years, a small-sized electric rotating machine efficiently generating electric power or rotational force has been required. That is, in a small-sized alternator or electric motor efficiently operated or generating a high voltage, it is desired that conductors disposed in slots of a stator core and conductors protruded from the slots as coil ends are disposed as densely as possible. Therefore, each of the conductive segments is formed of a straight angle wire formed in a rectangular shape in section, wires are disposed at smaller intervals, and the number of turns in a stator winding is increased. In this case, the segment is thinned, the number of end portions of segments to be connected with one another is increased, and a gap between end pairs is shortened. As a result, it is required to produce a stator winding with high precision. Further, it is desired to maintain a high degree of freedom in design even when the intervals of the segments are shortened, to maintain the insulation performance and reliability of the winding, and to stably and preferably weld end portions together at high speed.

In conclusion, in the manufacturing of a stator composed of a stator core and a series of conductive segments wound on the core in many layers and rows, it is important to provide a stator winding having small-sized coil ends in the axial direction of the core and a method of manufacturing the stator without increasing the number of parts or the number of assembling processes while the insulation performance and reliability are maintained in the winding.

SUMMARY OF THE INVENTION

An object of the present invention is to provide, with due consideration to the drawbacks of the conventional method of producing a stator winding, a stator of an electric rotating machine which has a small-sized coil end protruded from a stator core with high insulation performance and reliability. Further, the object of the present invention is to provide a method of manufacturing the stator with high insulation performance and reliability without increasing the number of parts in the winding or the number of assembling processes.

According to a first aspect of this invention, the object is achieved by the provision of a stator of an electric rotating machine comprising a stator core with a plurality of slots disposed along a circumferential direction of the stator core such that each of the slots extends along an axial direction of the stator core, and a stator winding composed of a plurality of conductor segments such that the conductor segments are disposed in the slots of the stator core so as to form a plurality of layers aligned with one another along a radial direction of the stator core in each of the slots and protrude from the slots. Each conductor segment except for an end thereof is covered with an insulation film. Each conductor segment comprises an inserted portion received in the corresponding slot, and a slanting port ion extending from the inserted port ion along an inclination direction inclined with respect to each of the circumferential and axial directions so as to protrude from the slot receiving the inserted portion. Each slanting portion in a part of the slanting portions comprises an oblique portion extending straight from the inserted portion, and a film removal portion extending from the oblique portion and having a film removed surface covered with no insulation film. Each film removal portion has a connection portion on an end of the film removal portion opposite to the oblique portion such that the connection portions of two conductor segments disposed in each pair of slots are connected with each other through the film removed surfaces so as to serially connect the conductor segments with one another. Each oblique portion has a slanting removal surface covered with no insulation film so that each slanting portion has a slanting removal area containing the film removed surface of the film removal portion and the slanting removal surface of the oblique portion.

With this structure of the stator, to connect the connection portions of each end pair, an electrode is disposed to be in contact with the slanting removal surfaces of the oblique portions and the film removed surfaces of the film removal portions. The slanting removal surface of each oblique portion is placed nearer to an axial end of the core than the film removed surface of the film removal portion.

Accordingly, a contact area of the electrode with the segments can be widened by an area of the slanting removal surfaces. In this case, because heat added to the connection portions is dissipated to the atmosphere through the electrode, a heat dissipating area can be widened. Accordingly, heat in the welding can be efficiently transmitted from the connection portions to the electrode through the oblique portions, so that the welding heat transmitted to the oblique portions can be immediately dissipated to the atmosphere. That is, the degradation of the insulation films of the oblique portions can be suppressed.

Further, in addition to the film removed surface, each slanting portion has the slanting removal surface extending toward the end of the core. Therefore, even when a length of the slanting portion is shortened, the same heat dissipating area as that in the prior art can be obtained. Accordingly, the slanting portions can be shortened while securing the heat dissipating area, and the height of a coil end group in the axial direction can be shortened.

Moreover, the slanting removal area of each slanting portion is placed to be further away from an axial end of the core than a crossing area where the oblique portion of the slanting portion and another oblique portion adjacent to each other along the radial direction cross each other through a gap. Therefore, even when a gap between the slanting portions adjacent to each other along the radial direction is narrow such that the slanting portions incidentally come in contact with each other, the slanting portions are electrically insulated from each other through the insulating films of the slanting portions. Accordingly, an electrical insulation of the slanting portions from each other can be reliably obtained, and the insulation between the segments having a narrow gap can be improved.

The object is also achieved by the provision of a stator of an electric rotating machine comprising the stator core and the stator winding composed of the conductor segments. Each conductor segment comprises the inserted portion and the slanting portion. Each slanting portion comprises the oblique portion and the film removal portion. Each film removal portion in a part of the film removal portions comprises a curved portion extending from the oblique portion and being curved toward the axial direction so as to be away from the stator core, and a risen connection portion extending from the curved portion along the axial direction such that the risen connection portions of two conductor segments disposed in each pair of slots are connected with each other through the film removed surfaces so as to serially connect the conductor segments with one another.

With this structure of the stator, a contact area of an electrode with the segments is widened by an area of the slanting removal surfaces, so that a heat dissipating area is widened. Therefore, heat in the welding is efficiently transmitted from the risen connection portions to the electrode through the oblique portions. Accordingly, the welding heat transmitted to the oblique portions can be immediately dissipated to the atmosphere, so that the degradation of the insulation films of the oblique portions can be suppressed.

Further, in addition to the film removed surface, each slanting portion has the slanting removal surface extending toward the end of the core. Accordingly, the slanting portions can be shortened while securing the heat dissipating area, and the height of a coil end group in the axial direction can be shortened.

Moreover, the slanting portions having a gap in the radial direction are electrically insulated from each other through the insulating films of the slanting portions. Accordingly, an electrical insulation of the slanting portions from each other can be reliably obtained, and the insulation between the segments having a narrow gap can be improved.

The object is also achieved by the provision of a method of manufacturing a stator of an electric rotating machine, comprising the step of preparing a stator core with a plurality of slots disposed along a circumferential direction of the stator core such that each of the slots extends along an axial direction of the stator core, the step of preparing a plurality of conductor segments covered with insulation films, respectively, the step of removing the insulating film of each conductor segment from each of ends of the conductor segment to form a film removal portion having a film removed surface covered with no insulating film at each end of the conductor segment and to form an oblique portion extending from the film removal portion and having a slanting removal surface, the step of disposing a plurality of inserted portions of the conductor segments in the slots of the stator core such that other portions of the conductor segments protrude from the slots and such that the conductor segments form a plurality of layers aligned with one another along a radial direction of the stator core in each of the slots, the step of bending the other portions of the conductor segments toward the circumferential direction to form a slanting portion composed of one film removal portion and one oblique portion from each of the other portions such that two connection portions placed at ends of the film removal portions in each pair are adjacent to each other as an end pair along the radial direction, the step of causing an electrode to make contact with the slanting removal surfaces of the oblique portions of the conductor segments in the innermost and outermost layers of the slots, and the step of welding the connection portions of each end pair together by supplying an arc current to the connection portions and by discharging the arc current from the electrode through the slanting removal surfaces so as to serially connect the conductor segments with one another.

In this manufacturing method of the stator, the slanting removal area of each slanting portion is placed nearer to an axial end of the core than the connection portion of the slanting portion. In this case, when the electrode is set to be in contact with the slanting removal areas of the slanting portions, the electrode is placed near the end of the core as compared with a prior art case where an electrode is set to be in contact with connection portions. Therefore, the electrode pushes the slanting portions at a low position near the end of the core. Accordingly, even when the electrode pushes the slanting portions at a comparatively high pushing force, the slanting portions are hardly inclined or bent.

Further, the electrode is disposed to be in contact with the slanting removal surface of each slanting portion, in addition to the film removal surface, so that the electrode is in contact with the slanting portion at a wider contact area. Accordingly, a large amount of arc current can pass through the connection portions of each end pair in the welding process, and the welding for the end pairs can rapidly be performed. Further, even when a length of the slanting portion is shortened, the same contact area and welding quality as those in the prior art are obtained at the same welding conditions as those in the prior art. Accordingly, a length of the slanting portion can be shortened while securing the contact area and welding quality, and the height of a coil end group of the segments protruded from the slots of the core can be further shortened.

BRIEF DESCRIPTION OF THE DRAWINGS

FIG. 10 is a flow chart showing a manufacturing process of the stator shown in FIG. 7;

FIG. 11A is a side view along a radial direction to show two small conductor segments and four larger conductor segments inserted into two slots in a segment arranging process;

FIG. 11B is a schematic perspective view of a part of the stator seen from an outer side of a core to show the segments inserted in slots in the process;

FIG. 12A is a side view along a radial direction to show four slanting portions of two small conductor segments and four slanting portions of four larger conductor segments bent in an end pair forming process;

FIG. 12B is a schematic perspective view of a part of the stator seen from an outer side of the core to show the segments bent in the process;

FIG. 13A is a side view along a radial direction to show two small conductor segments and four larger conductor segments restrained by electrodes in an electrode disposing process;

FIG. 13B is a schematic perspective view of a part of the stator seen from an outer side of the core to show the segments restrained in the process;

FIG. 15A is a side view along a radial direction to show arc current flowing through connection portions of segments forming first and second middle layers in an indirectly-earthed arc welding process;

FIG. 15B is a schematic perspective view of a part of the stator seen from an outer side of the core to show the segments welded in the process.

DETAILED DESCRIPTION OF THE PREFERRED EMBODIMENT

An embodiment of the present invention and modifications of the embodiment will now be described with reference to the accompanying drawings.

Embodiment

Figure 6:
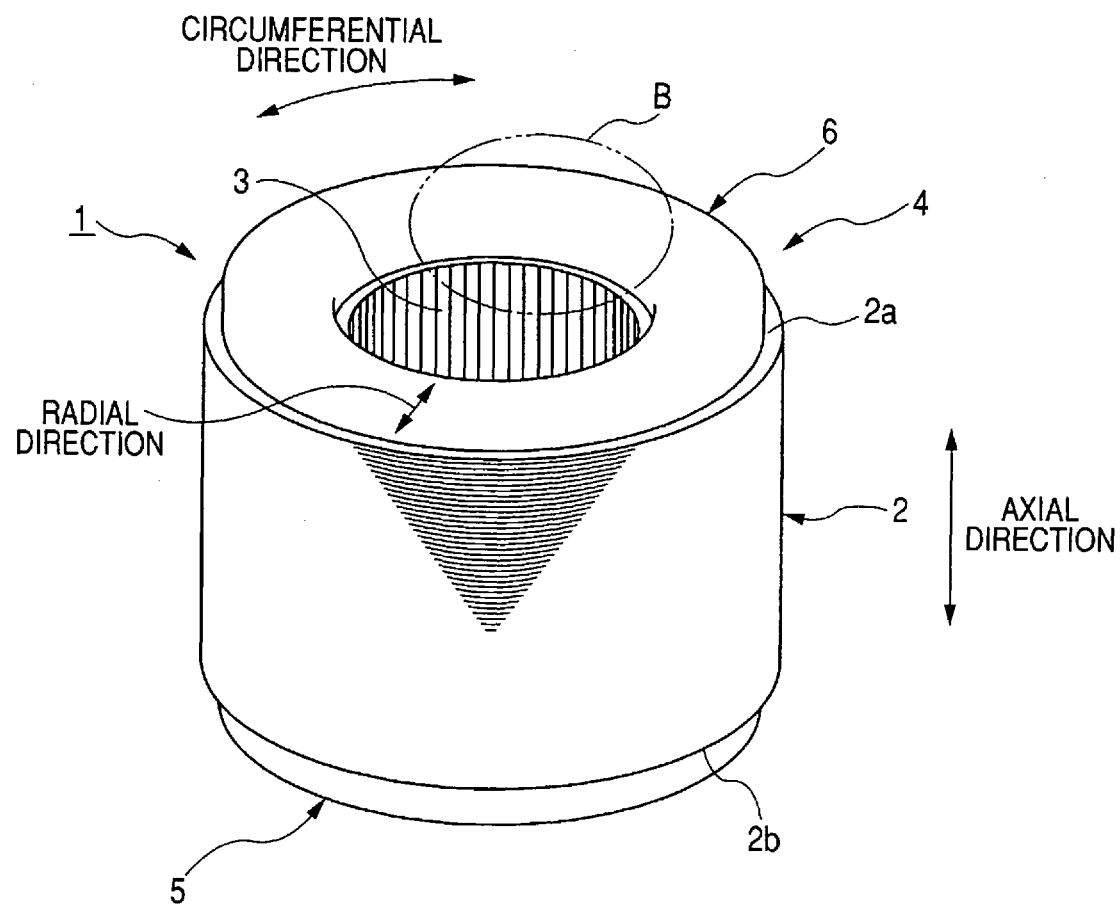
FIG. 6 is a perspective side view of a stator with a stator winding for an electric rotating machine according to an embodiment of the present invention.
Figure 7:
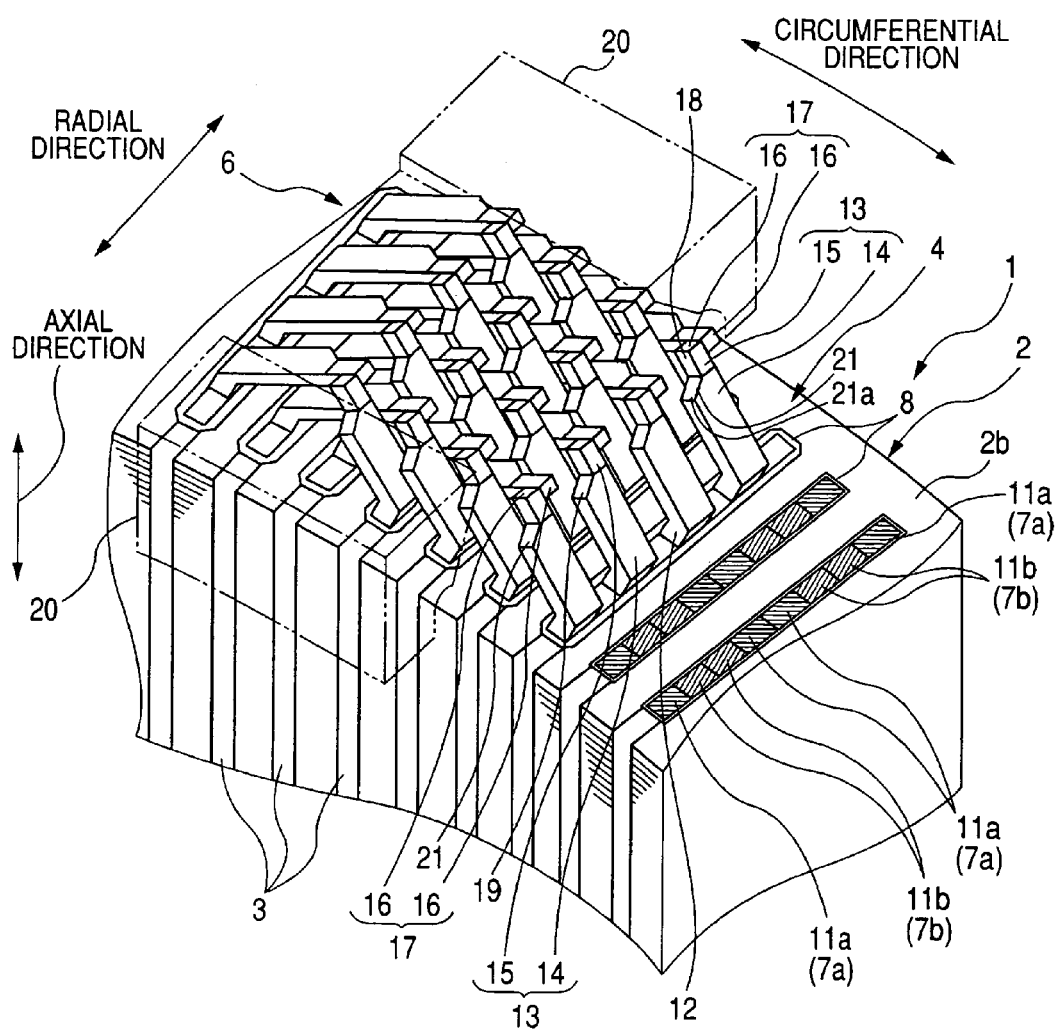
FIG. 7 is an enlarged perspective side view, partially in cross-section, of a stator to show a coil end group of the winding shown in FIG. 6.
Figure 8:
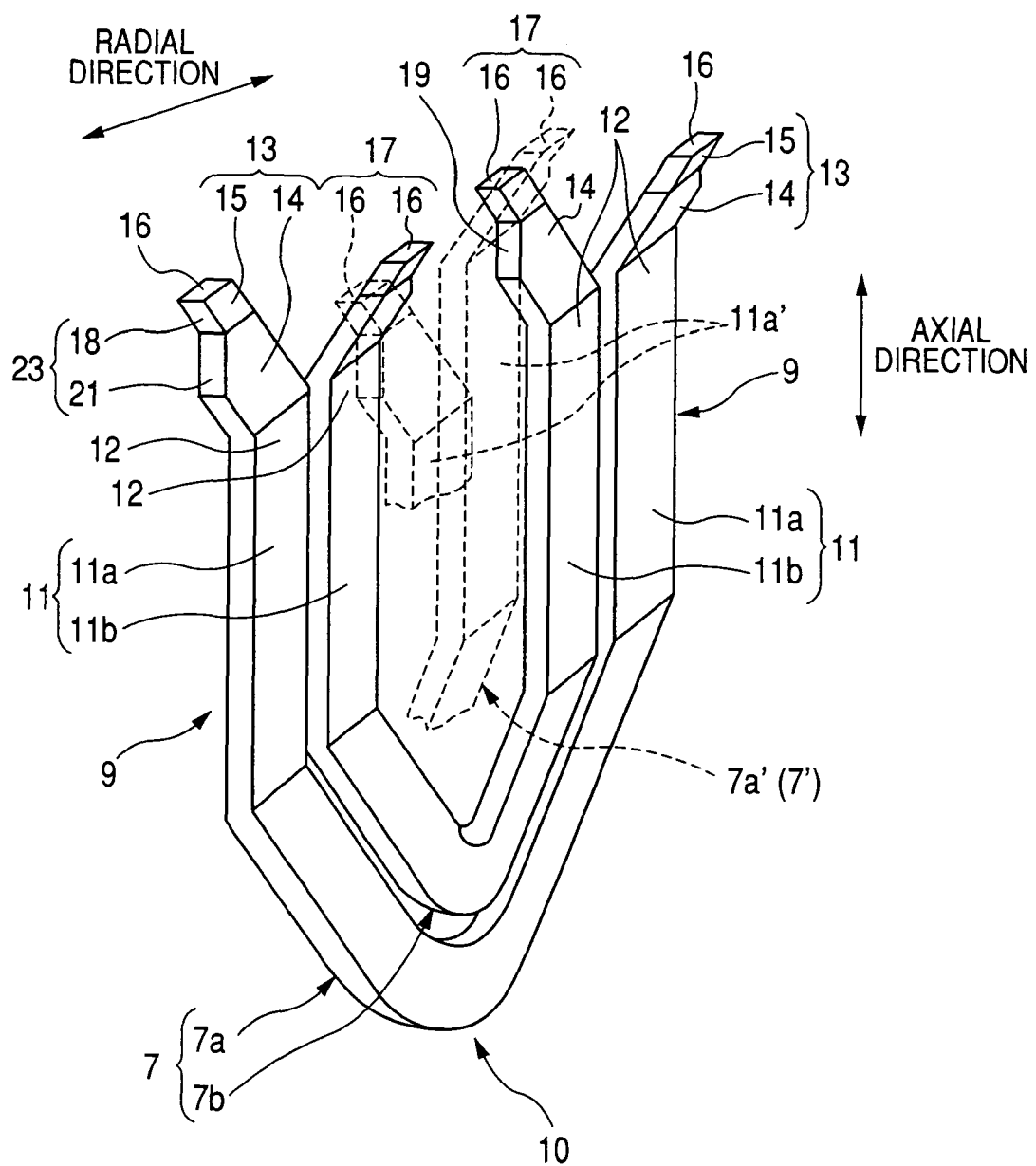
FIG. 8 is a perspective side view of a segment set bent to form the winding shown in FIG. 6.

FIG. 6 is a perspective side view of a stator with a stator winding for an electric rotating machine according to this embodiment, FIG. 7 is an enlarged perspective side view, partially in cross-section, of the stator to show a coil end group of the winding shown in FIG. 6, and FIG. 8 is a perspective side view of a segment set bent to form the winding shown in FIG. 6. A partial coil end group shown in FIG. 7 is placed in an area indicated by a circle B of FIG. 6. The stator shown in FIG. 6 is used for an electric motor representing an electric rotating machine so as to generate a large amount of electric current set at a high voltage from a rotational force added to a rotor of the motor. This motor is, for example, mounted on a vehicle.

As shown in FIG. 6 and FIG. 7, a stator 1 has a cylindrical stator core 2 and a stator winding 4 wound on the core 2. A rotor (not shown) is disposed in a central hole of the stator 1. The core 2 has a lamination of a plurality of core sheets made of steel plates. On an inner circumferential surface of the core 2, a plurality of slots 3 are formed so as to be aligned along a circumferential direction of the core 2 at equal intervals. Each slot 3 penetrates through the core 2 in an axial direction of the core 2. Each slot 3 extends toward an outer circumferential surface of the core 2 along a radial direction of the core 2 so as to form the slots 3 in a radial manner. The slots 3 receive portions of the winding 4. Portions of the winding 4 protruding from a first axial end 2a of the core 2 form a first coil end group 5, and portions of the winding 4 protruding from a second axial end 2b of the core 2 form a second coil end group 6.

The winding 4 is composed of three phase windings representing multi-phase windings. The phase windings are formed in Y-connection. In this embodiment, the winding 4 representing only one phase winding is described hereinafter for convenience.

The winding 4 is formed of a plurality of conductive segments 7 serially connected with one another. Each segment 7 is made of an electric conductor covered with an insulation film. Each slot 3 receives eight segments 7 aligned along the radial direction to form eight layers. An insulating sheet 8 is disposed on the core 2 so as to surround each slot 3. Therefore, each segment 7 received in the slot 3 is electrically insulated from the core 2 by the film and sheet 8.

As shown in FIG. 8, as the conductive segments 7, a plurality of segment sets are used to form the winding 4. Each segment set is composed of a larger conductive segment 7a and a smaller conductive segment 7b surrounded by the segment 7a. Each of the segments 7a and 7b is formed in a U shape and represents one conductive segment 7. To form each segment 7, a straight angle wire formed in a rectangular shape in section and covered with an insulating film is cut out so as to have a predetermined length, the cut wire is bent in a U shape to form two straight portions 9 and a U-shaped (or turn) portion 10, and the straight portions 9 are twisted so as to widen a distance between the portions 9 to a predetermined span.

The four straight portions 9 of each segment set are inserted into two slots 3 from the first axial side of the core 2 so as to protrude from the second axial end 2b of the core 2. A part of each straight portion 9 placed into the slot 3 is called an inserted portion 11 (11a, 11b). Another part of each straight portion 9 protruding from the slot 3 is bent at a predetermined distance from the end 2b of the core 2 toward the circumferential direction to form a protruding portion 12 not bent (see FIG. 7) and to form a slanting portion 13 bent and inclined. The slanting portion 13 extends along an inclination direction inclined with respect to each of the circumferential and axial directions. Therefore, the second coil end group 6 is formed on the second axial side of the core 2.

Each slanting portion 13 extends straight and has an oblique portion 14 and a film removal portion 15. The oblique portion 14 extends straight from the inserted portion 11 toward the inclination direction so as to be away from the core 2. The film removal portion 15 is placed at an end of the slanting portion 13 and extends from the oblique portion 14 toward the inclination direction. After the formation of the straight portion 9 or after the insertion of the straight portion 9 into the slot 3, the film removal portion 15 is formed by shaping the end of the slanting portion 13.

To form the film removal portion 15, an insulation film covering each end of the segments 7 is removed by a cutter, chemicals or the like. Then, a part of the end on the outer side of the segment 7a in the radial direction is cut off by a cutter to thin the end in the radial direction, and a part of the end on the inner side of the segment 7b in the radial direction is cutoff. Therefore, one film removal portion 15 is formed of each thinned end of the segments 7.

This formation of the portion 15 can be applied for a case where the portion 15 has a risen portion standing in the axial direction on an end of the oblique portion 14. In this case, insulation film is removed from the risen portion.

The portion 15 has a width in the radial direction smaller than a width of the oblique portion 14. Further, a cut-off surface 18 not covered with any insulating film is formed due to the thinning on the portion 15 so as to face toward the outer side of the segment 7a or the inner side of the segment 7b. Because the portion 15 is covered with no insulating film, the portion 15 has a film removed surface containing the cut-off surface 18.

Each portion 15 has a connection portion 16 at an end of the portion 15 on a side opposite to the side of the oblique portion 14. As described later in detail, two connection portions 16 adjacent to each other along the radial direction form an end pair 17 and are connected with each other in a welding process.

An end of each oblique portion 14 in the segments 7a is slantingly cut off at a wide angle to the extending direction of the oblique portion 14 to form a slanting removal surface 21. The surface 21 is covered with no insulating film. The surface 21 is inclined with respect to the extending direction of the slanting portion 13 and successively changes a width of the oblique portion 14 from the width of the connection portion 16 to the width of the inserted portion 11a. Therefore, a slanting removal area 23 containing the cut-off surface 18 of the portion 15 and the surface 21 of the portion 14 is disposed on the slanting potion 13.

The slanting removal area 23 may be formed only on the film removal portion 15 by slantingly cutting off the portion 15 at a wide angle to the extending direction of the portion 15 so as to widen the cut-off surface 18. Further, the area 23 disposed on each of the slanting portions 13 corresponding to the innermost and outermost layers may have a length along the extending direction of the portion 13 larger than a length of the area 23 disposed on each of the slanting portions 13 corresponding to the middle layers placed between the innermost and outermost layers. In this case, a slanting removal surface 19 having a length shorter than that of the surface 21 may be disposed on each of the oblique portions 14 of the segments 7 forming the middle layers. This surface 19 extends from the cut-off surface 18 to successively change a width of the oblique portion 14 in the radial direction from the width of the film removal portion 15 to a width of the inserted portion 11b.

Therefore, the slanting portions 13 of each segment 7a forming the outermost layer have the slanting removal areas 23 on the outer side of the segment 7a, and the slanting portions 13 of each segment 7a forming the innermost layer have the slanting removal areas 23 on the inner side of the segment 7a. Therefore, each slanting portion 13 of the segments 7 has different heights in the radial direction on the side having the area 23. In contrast, each portion 13 of the segments 7a has a flat surface on the inner side, and each portion 13 of the segments 7b has a flat surface on the outer side.

With this structure, as shown in FIG. 7, when the segments 7 protruding from the slots of the core 2 are bent to form the slanting portions 13, the connection portions 16 of each pair of segments 7a and 7b adjacent to each other along the radial direction are aligned along the radial direction to closely cross each other through the film removed surfaces and to form one end pair 17. In contrast, the connection portions 16 of two segments 7a adjacent to each other along the radial direction are aligned along the radial direction to be away from each other through cut-off portions, and the connection portions 16 of two segments 7b adjacent to each other along the radial direction are aligned along the radial direction to be away from each other through cut-off portions.

Therefore, when electrodes 20 (indicated by a two-dots-dash line in FIG. 7) acting as a restraining device are disposed in a welding process so as to push the surfaces 18 and 21 of the slanting portions 13 of the conductive segments 7a in the innermost and outermost layers, the connection portion 16 of each segment 7a pushed by the electrode 20 can reliably be in contact with another connection portion 16 of one segment 7b adjacent to the segment 7a through the film removed surfaces of the connection portions 16. Accordingly, the connection portions 16 can reliably be welded together by arc welding.

The reason that the slanting removal surfaces 21 of the segments 7a are formed in addition to the cut-off surfaces 18 is described. Each slanting portion 13 is shaped to thin the film removal portion 15 and to make the electrode 20 be in contact with the cut-off surface 18 of the film removed surface. Therefore, it is allowed that the slanting portion 13 has only the surface 18 being in contact with the electrode 20. However, to make the electrode 20 reliably and stably be in contact with the segment 7 in a larger contact area, it is preferred that the electrode 20 be in contact with the slanting removal surface 21 and the cut-off surface 18. In this case, because the surfaces 18 and 21 have different heights in the radial direction, the electrode 20 can reliably and stably be in contact with the faces 18 and 21 in a larger contact area.

In a modification, because the electrodes 20 are disposed to be in contact with the slanting portions 13 of the segments 7a disposed in the innermost and outermost layers, the slanting removal surfaces 21 may be formed on the oblique portions 14 of the segments 7a disposed only in the innermost and outermost layers. In this case, each oblique portion 14 of the segments 7a disposed in the other layers has one slanting surface 19. With this structure, insulation between the oblique portions 14 adjacent to each other along the radial direction can be improved.

Further, each surface 21 may have a portion set at the same height as that of the surface 18.

Figure 9:
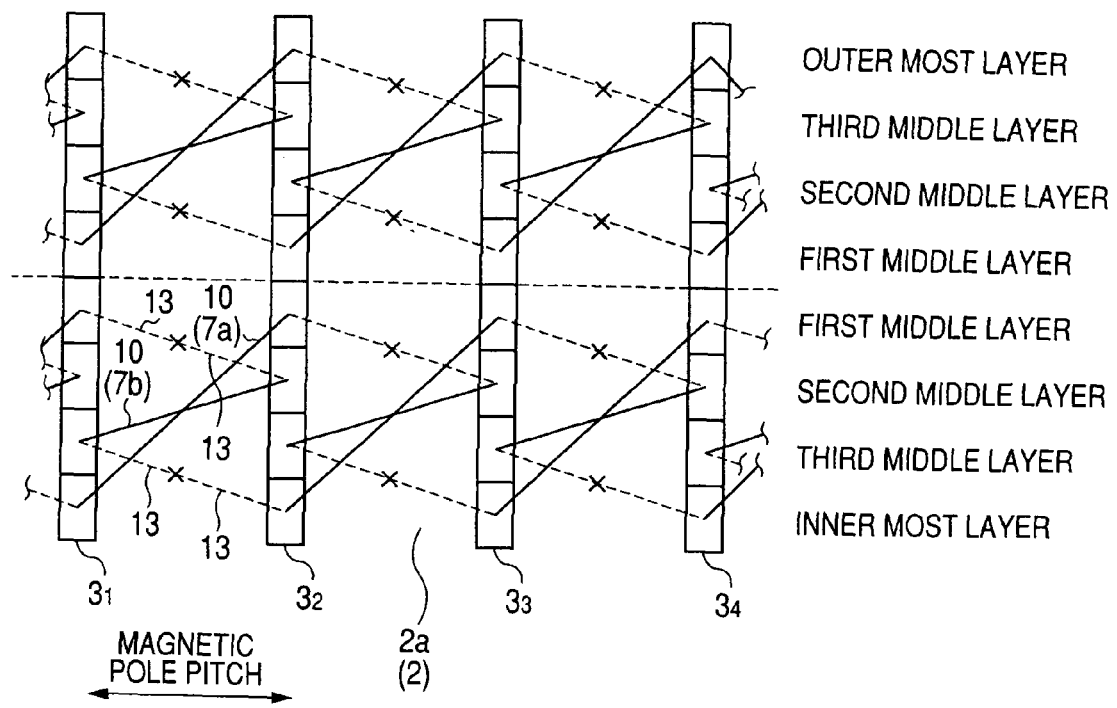
FIG. 9 is a schematic view showing an arrangement of segment sets in slots.

Next, an arrangement of the segments 7 inserted into the slots 3 is described with reference to FIG. 9. FIG. 9 is a schematic view showing an arrangement of the segments 7 in the slots 3. In FIG. 9, each of solid lines indicates the U-shaped portion 10 of one segment 7 protruding from the first axial side of the core 2, and each of dotted lines indicates the slanting portion 13 of one segment 7 protruding from the second axial side of the core 2. The symbol "X" indicates a connection of two slanting portions 13 with each other. A plurality of slots $3_1, 3_2, 3_3, 3_4,$ - - - are disposed at magnetic pole pitches along the clockwise direction.

As shown in FIG. 9, each slot 3 is partitioned into inner and outer circumferential regions aligned with each other along the radial direction. One set of larger and smaller conductive segments 7a and 7b is inserted into the inner circumferential regions of each pair of slots 3 away from each other by one magnetic pole pitch, and another set of larger and smaller conductive segments 7a and 7b is inserted into the outer circumferential regions of each pair of slots 3 away from each other by one magnetic pole pitch. An arrangement of the segments 7 in the inner circumferential regions of the slots 3 is the same as that in the outer circumferential regions of the slots 3. Therefore, only an arrangement of the segments 7 in the inner circumferential regions of the slots 3 is described.

Two inserted portions 11a of one segment 7a are received in each pair of slots $3_i$ and $3_{i+1}$ (i=1, 2, 3, - - - ) to form the innermost layer in the slot $3_i$ and to form the first middle layer in the slot $3_{i+1}$. Two inserted portions 11b of one segment 7b are received in each pair of slots $3_i$ and $3_{i+1}$ to form the second middle layer in the slot $3_{i+1}$ and to form the third middle layer in the slot $3_i$. The U-shaped portion 10 of the segment 7a overpasses the U-shaped portion 10 of the segment 7b on the first axial side of the core 2 so as to surround the U-shaped portion 10 of the segment 7b. The U-shaped portions 10 of all segments 7b form a group of middle layer coil ends, and the U-shaped portions 10 of all segments 7a form a group of end layer coil ends. Therefore, on the first axial side of the core 2, the first coil end group 5 is formed of the groups of layer coil ends in the inner circumferential regions and the groups of layer coil ends in the outer circumferential regions.

On the second axial side of the core 2, one slanting portion 13 of one segment 7b forming the third middle layer in each slot $3_i$ is disposed adjacent to the slanting portion 13 of another segment 7a' (symbol "'" denotes segment of different set) forming the innermost layer in the slot $3_{i+1}$ along the radial direction. The connection portions 16 of the segments 7b and 7a' disposed between the slot $3_i$ and $3_{i+1}$ form one inner end pair 17 to be connected with each other (see FIG. 7). One slanting portion 13 of one segment 7a forming the first middle layer in each slot $3_i$ is disposed adjacent to the slanting portion 13 of another segment 7b' forming the second middle layer in the slot $3_{i+1}$ along the radial direction. The connection portions 16 of the segments 7b and 7a' disposed between the slot $3_i$ and $3_{i+1}$ form one outer end pair 17 to be connected with each other (see FIG. 7). The inner end pair 17 and the outer end pair 17 are aligned with each other along the radial direction.

Therefore, the inner and outer end pairs 17 in the inner circumferential regions and the inner and outer end pairs 17 in the outer circumferential regions are aligned with one another along the radial direction. On the second axial side of the core 2, the second coil end group 6 is formed of the slanting portions 13 of all segments 7 including the inner and outer end pairs 17 (see FIG. 7).

With this arrangement of the segments 7, the segment 7b forming the third middle layer in the slot $3_i$ and the second middle layer in the slot $3_{i+1}$ is connected with one segment 7a' forming the innermost layer in the slot $3_{i+1}$ and another segment 7a' forming the first middle layer in the slot $3_i$. That is, each segment 7b is not directly connected with the segment 7a of the same segment set but is connected with the segments 7a' of different segment sets. In the same manner, the segment 7a forming the innermost layer in the slot $3_i$ and the first middle layer in the slot $3_{i+1}$ is be connected with one segment 7b' forming the second middle layer in the slot $3_{i+2}$ and another segment 7b' forming the third middle layer in the slot $3_{i-1}$. That is, each segment 7a is not directly connected with the segment 7b of the same segment set but is connected with the segments 7b' of different segment sets. Therefore, all segments 7a and 7b inserted into the slots 3 can be serially connected with each other so as to go around the core 2 along the circumferential direction.

As shown in FIG. 7, on the second axial side of the core 2, the inserted portions 11a of four segments 7a and the inserted portions 11b of four segments 7b are densely received in each slot 3 along the radial direction to form the stator winding 4 in eight layers. Further, four end pairs 17 aligned along the radial direction are disposed so as to form four different concentric circles. Therefore, the stator winding 4 has an arrangement structure formed in eight layers and four rows.

Each film removal portion 15 is thinned in the radial direction, so that the four end pairs 17 aligned along the radial direction are disposed so as to have sufficient intervals from one another. Accordingly, the end pairs 17 of the winding 4 can reliably be out of contact with one another, so that the insulation of the end pairs 17 from one another can reliably be secured.

Further, the slanting removal surface 21 (i.e., slanting removal area 23) of each slanting portion 13 of the segments 7a is placed to be higher (i.e., further away from the second axial end 2b of the core 2) than a conductor crossing area where the oblique portion 14 of the slanting portion 13 and another oblique portion 14 adjacent to each other along the radial direction cross each other through a gap. Therefore, even when a gap between the slanting portions 13 adjacent to each other in the radial direction is narrow such that the slanting portions 13 incidentally come in contact with each other, the slanting portions 13 can be insulated from each other through the insulation films of the portions 13. Accordingly, an electrical insulation of the slanting portions 13 from each other can be reliably obtained, and the insulation between the segments 7 having a narrow gap in the radial direction can be improved.

Moreover, the end pairs 17 of each row are disposed along the circumferential direction at equal intervals which are the same as those of the slots 3. Accordingly, the end pairs 17 adjacent to each other in the circumferential direction can reliably be out of contact with each other, and the insulation of the end pairs 17 from each other can reliably be secured.

In a connection of the connection portions 16 of each end pair 17, one electrode 20 is disposed to be in contact with the end pairs 17 of the innermost row, and another electrode 20 is disposed to be in contact with the end pairs 17 of the outermost row. Then, the connection portions 16 of each end pair 17 are connected with each other by arc welding. Therefore, the stator winding 4 formed of the segments 7 electrically connected with one another in series is obtained.

Next, a manufacturing process of the stator 1 is described with reference to FIG. 10. FIG. 10 is a flow chart showing a manufacturing process of the stator 1.

As shown in FIG. 10, the stator core 2 is produced in a stator core producing process P1, and each segment 7 is produced in a segment producing process P2. These processes P1 and P2 may be performed in parallel to each other. In the process P2, a segment bending process P21 and a film removing process P22 are performed, and then a turn portion producing process P23 is performed. The process P21 may be performed before the process P22, or the process P22 may be performed before the process P21.

In the process P21, a straight angle wire formed in a rectangular shape in section is cut and bent in U shape to form larger and smaller conductive segments. Each segment has two straight portions. In the process P22, an insulation film covering an end of each straight portion is removed, and the end is thinned to form a film removal portion. In the process P23, two straight portions of each segment are twisted and widened to a predetermined span to form a turn portion coil end (i.e., U-shaped portion). Therefore, the segments 7a with the film removal portions 15 and the segments 7b with the film removal portions 15 are formed.

Thereafter, in a segment arranging process P3, the segments 7a and 7b are inserted into all slots 3 of the core 2 in a predetermined arrangement of the segments 7a and 7b shown in FIG. 9 so as to form eight layers. In an end pair forming process P4, the straight portions 9 of the segments 7a and 7b are bent to form a plurality of end pairs 17 having four rows. In an electrode disposing process P5, electrodes 20 (see FIG. 7) are disposed so as to be in contact with the surfaces 18 and 21 of the segments 7a forming the innermost and outermost layers. In a basic welding process P6, the connection portions 16 of each end pair 17 are welded together in arc welding using the electrodes 20 to serially connect the segments 7a and 7b inserted into the inner circumferential regions of the slots 3. In a basic welding repeating process P7, in the same manner as in the process P6, the segments 7a and 7b inserted into the outer circumferential regions of the slots 3 are serially connected with one another. In a lead line extracting process P8, the segments 7a and 7b serially connected with one another are taken out as lead lines to complete the production of the stator 1 wherein the winding 4 having eight layers and four rows is wound on the core 2.

The segment arranging process P3 is described in detail with reference to FIG. 11A and FIG. 11B. FIG. 11A is a side view along the radial direction to show two segments 7b and four segments 7a inserted into two slots 3 in the process P3, and FIG. 11B is a schematic perspective view of a part of the stator 1 seen from the outer side of the core 2 to show the segments 7 inserted into the slots 3 in the process P3.

In the process P3, four straight portions 9 of one set of segments 7a and 7b are inserted from the first axial side of the core 2 into each of the inner and outer circumferential regions of each pair of slots 3 away from each other by one magnetic pole pitch. In this insertion, as shown in FIG. 11A and FIG. 11B, two inserted portions 11a and 11b of the segments 7a and 7b are received in each circumferential region of one slot 3 through the insulation sheet 8, and two other inserted portions 11a and 11b of the segments 7a and 7b are received in each circumferential region of the other slot 3 through the insulation sheet 8. Therefore, eight inserted portions 11a and 11b of eight segments 7a and 7b aligned along the radial direction are received in each slot 3 to form eight layers. Portions of the segments 7a and 7b protrude from the slots 3 on the second axial side of the core 2.

Then, end pairs 17 are formed in an end pair forming process P4 (see FIG. 10). This process P4 is described in detail with reference to FIG. 12A and FIG. 12B. FIG. 12A is a side view along the radial direction to show four slanting portions 13 of two segments 7b and four slanting portions 13 of four segments 7a bent in the process P4, and FIG. 12B is a schematic perspective view of a part of the stator 1 seen from the outer side of the core 2 to show the segments 7 bent in the process P4.

As shown in FIG. 12A and FIG. 12B, in the process P4, each member of a bending device (not shown) is placed between the film removal portions 15 without holding the portions 15. Then, the device bents portions of the segments 7, which protrude from ends of the slots 3 (i.e., second axial end 2b of core 2), at a predetermined height from the core 2 toward the circumferential direction to form the protruding portions 12 not bent and to form the slanting portions 13 extending straight along the inclination direction.

More specifically, as shown in FIG. 8 and FIG. 12B, portions of each segment 7a protruding from the core 2 are bent to be away from each other such that the slanting portion 13 of each segment 7a extends along the circumferential direction by half of one magnetic pole pitch. Therefore, the film removal portions 15 of each segment 7a are away from each other by two magnetic pole pitches. In contrast, portions of each segment 7b protruding from the core 2 are bent to approach each other such that the slanting portion 13 of each segment 7b extends along the circumferential direction by half of one magnetic pole pitch. Therefore, the connection portions 16 of each segment 7b are placed at the same position in the circumferential direction. In this case, as shown in FIG. 7, eight connection portions 16 are aligned with one another along the radial direction.

Further, the segments 7 have been cut off in the process P1 so as to thin the film removal portions 15. Therefore, two connection portions 16 closely approach each other so as to be connected with each other as one end pair 17, and two connection portions 16 not to be connected with each other are sufficiently separated from each other. More specifically, the connection portions 16 of each pair of adjacent segments 7a and 7b forming the innermost and third middle layers are disposed to closely face each other in the radial direction, and the connection portions 16 of each pair of adjacent segments 7a and 7b forming the first and second middle layers are disposed to closely face each other in the radial direction. In contrast, the connection portions 16 of each pair of adjacent segments 7b and 7b forming the second and third middle layers are disposed away from each other so as to be sufficiently insulated from each other, and the connection portions 16 of each pair of adjacent segments 7a and 7a forming the first middle layers in the inner and outer circumferential regions are disposed away from each other so as to be sufficiently insulated from each other.

Therefore, a plurality of pairs of two connection portions 16 to be connected with each other are aligned along the circumferential direction, and the pairs of two connection portions 16 form four rows in a concentric shape. Accordingly, the welding can successively and automatically be performed for the pairs of two connection portions 16 to be connected with each other while maintaining the insulation between two end pairs 17 adjacent to each other.

Further, even when melted metal is formed during the welding of one end pair 17, no melted metal is attached to another end pair 17. Accordingly, the welding can be performed at high quality. Moreover, because a volume of each connection portion 16 becomes small due to the thinning of the connection portion 16, heat required to form each end pair 17 can be reduced, or the welding for each end pair 17 can be performed in a shorter time. Accordingly, the welding can rapidly be performed.

After the completion of the end pair forming process P4, an electrode disposing process P5 (see FIG. 10) is performed. This process P5 is described with reference to FIG. 13A and FIG. 13B. FIG. 13A is a side view along the radial direction to show two segments 7b and four segments 7a restrained by electrodes 20 in the process P5, and FIG. 13B is a schematic perspective view of a part of the stator 1 seen from the outer side of the core 2 to show the segments 7a restrained in the process P5.

As shown in FIG. 13A and FIG. 13B, the stator 1 with the winding 4 including the end pairs 17 not welded is disposed on a holding board (not shown) so as to direct the second coil end group 6 upward. Then, electrodes 20 such as an inner side electrode 20a and an outer side electrode 20b acting as a restraining device 24 are disposed so as to restrain the slanting portions 13 of the winding 4. When the connection portions 16 of each end pair 17 are welded together, a welding current passes through each electrode 20.

More specifically, each of the electrodes 20 is shaped so as to fit with the surfaces 18 and 21 formed on each slanting portion 13. Then, the electrode 20a is disposed so as to push the surfaces 18 and 21 of the segments 7a forming the innermost layer from the inner side of the core 2, and the electrode 20b is disposed so as to push the surfaces 18 and 21 of the segments 7a forming the outermost layer from the outer side of the core 2. Therefore, the connection portions 16 of each end pair 17 disposed on the inner side of the core 2 come in contact with each other through the film removed surfaces, and the connection portions 16 of each end pair 17 disposed on the outer side of the core 2 come in contact with each other through the film removed surfaces.

Each of the electrodes 20a and 20b is formed in a ring shape by serially connecting a plurality of fan-shaped elements or is formed like the spokes of a wheel by arranging a plurality of bar-shaped elements. Each fan-shaped element or bar-shaped element is movable in the radial direction by means of a driving device (not shown) so as to come in contact with each slanting portion 13 at an adequate pushing force and to be detached from the slanting portion 13. The electrode 20a fixes the position of the end pairs 17 placed on the inner side of the core 2. The electrode 20b fixes the position of the end pairs 17 placed on the outer side of the core 2.

An end 21a of the slanting removal surface 21 of each slanting portion 13 facing the end 2b of the core 2 is placed to be nearer to the end 2b of the core 2 than the connection portion 16 of the portion 13. Therefore, each electrode 20 being in contact with the slanting removal area 23 of each slanting portion 13 pushes the slanting portion 13 at a low position near the end 2b of the core 2. Accordingly, even when the electrode 20 pushes the slanting portions 13 at a comparatively high pushing force, the slanting portions 13 are hardly inclined or bent. Further, because of the area 23 wider than the surface 18, each electrode 20 can be in contact with the segment 7 at a wider contact area. Accordingly, a large amount of arc current can pass through the connection portions 16 of each end pair 17 in a welding process, and the welding for the end pairs 17 can rapidly be performed.

In the process P5, each of the electrodes is disposed so as to push the surfaces 18 and 21. However, each electrode may be disposed so as to push the surfaces 21 without being in contact with the surfaces 18.

Figure 14A:
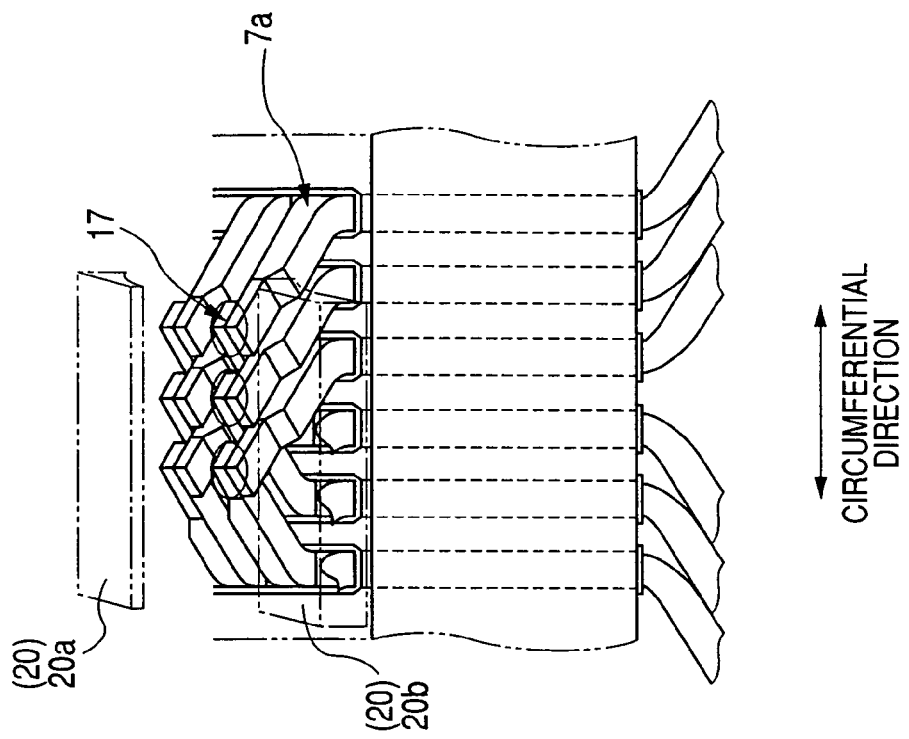
FIG. 14A is a side view along a radial direction to show arc current flowing through connection portions of segments forming innermost and third middle layers in a directly-earthed arc welding process.

After the completion of the process P5, as shown in FIG. 10, a basic welding process P6 is performed. The process P6 is composed of a directly-earthed arc welding process P61 and an indirectly-earthed arc welding process P62. The process P61 is described with reference to FIG. 14A and FIG. 14B. FIG. 14A is a side view along the radial direction to show arc current flowing through connection portions of segments forming innermost and third middle layers in the process P61, and FIG. 14B is a schematic perspective view of a part of the stator 1 seen from the outer side of the core 2 to show end pairs 17 of the segments 7 welded in the process P61.

Figure 14B:
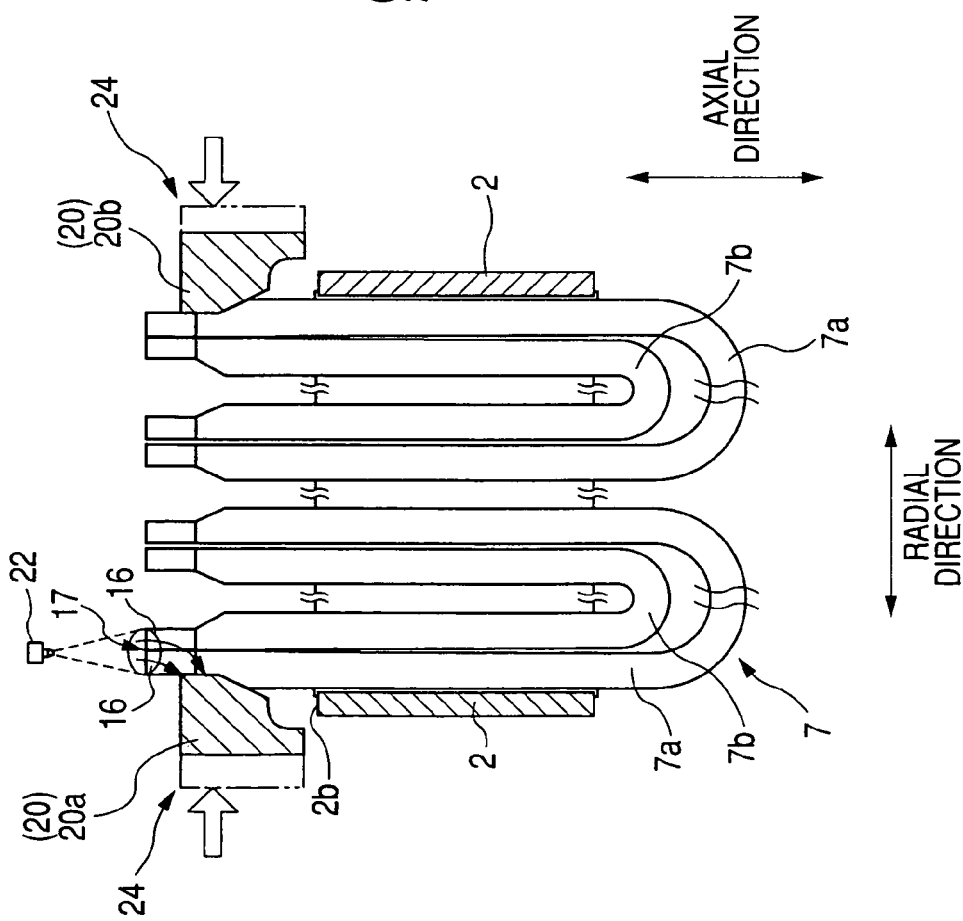
FIG. 14B is a schematic perspective view of a part of the stator seen from an outer side of the core to show the segments welded in the process.

As shown in FIG. 14A and FIG. 14B, in the process P61, because the end pairs 17 of the innermost row are pushed by the electrode 20a, the connection portions 16 of each end pair 17 keep in contact with each other through the film removed surfaces of the connection portions 16. Therefore, an arc welding circuit is formed in the connection portions 16 and the electrode 20a. That is, not only the connection portions 16 of the segments 7a forming the innermost layer are electrically connected with the electrode 20a, but also the connection portions 16 of the segments 7b forming the third middle layer adjacent to the innermost layer are electrically connected with the electrode 20a through the connection portions 16 of the segments 7a.

A torch 22 of a TIG (tungsten inert gas) welding device is positioned just above a first end pair 17 pushed by the electrode 20a. This TIG welding device has a welding robot with a robot arm (not shown) to move the torch 22. Because the device is well known, a further description of the device is omitted. Then, a welding current (shown by arrows in FIG. 14A) is supplied to flow from the torch 22 to the electrode 20a through the first end pair 17, and the torch 22 gives arc discharges to the first end pair 17 along the axial direction from an upper side of the first end pair 17. Therefore, the areas of the connection portions 16 electrically connected with each other in the first end pair 17 are melted, and the connection portions 16 are welded together.

When there is a difference in height along the axial direction between the connection portions 16 of one end pair 17, the higher connection portion 16 first receives the arc discharges, and then the lower connection portion 16 secondly receives the arc discharges. Therefore, the connect ion portions 16 of the end pair 17 having a difference in height can be welded together.

After the welding of the first end pair 17, the board holding the stator 1 is rotated by a driving device (not shown) to rotationally move the core 2 and to place the torch 22 over a second end pair 17 adjacent to the first end pair 17 in the circumferential direction. Further, the activation of the TIG welding device is continued, so that the arc current still flows through the torch 22. Therefore, the arc discharges to the second end pair 17 are immediately started, and the connection portions 16 of the second end pair 17 are welded together. In the same manner, all end pairs 17 of the innermost row are welded during one rotation of the core 2. Then, the torch 22 is moved toward a top of one end pair 17 forming a second inner row adjacent to the innermost row. Thereafter, another welding technique is performed to weld the end pairs 17 of the second inner row one after another.

Figure 1:
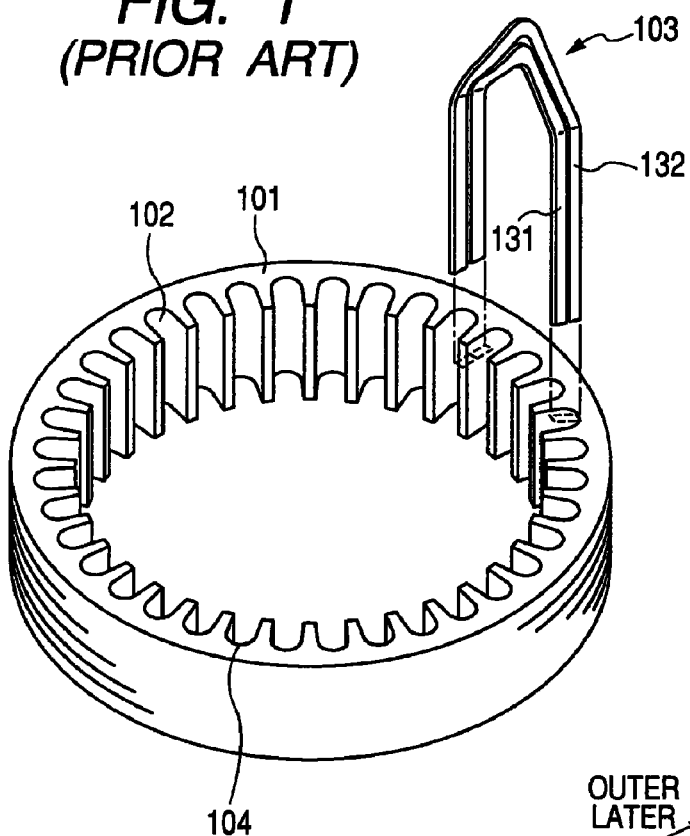
FIG. 1 shows a segment set to be inserted into slots of a stator core according to a prior art.
Figure 2:
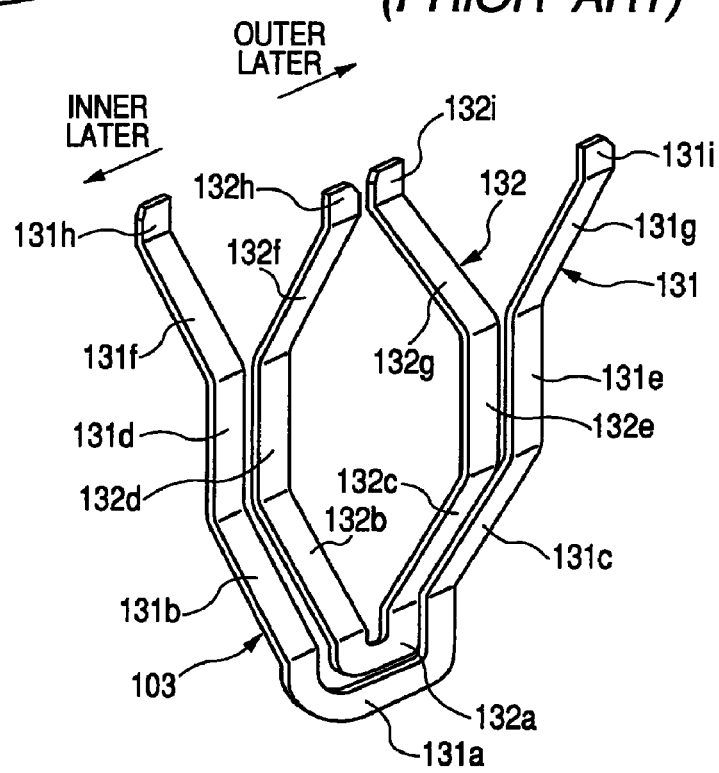
FIG. 2 shows the segment set deformed by a twisting device according to the prior art.
Figure 3:
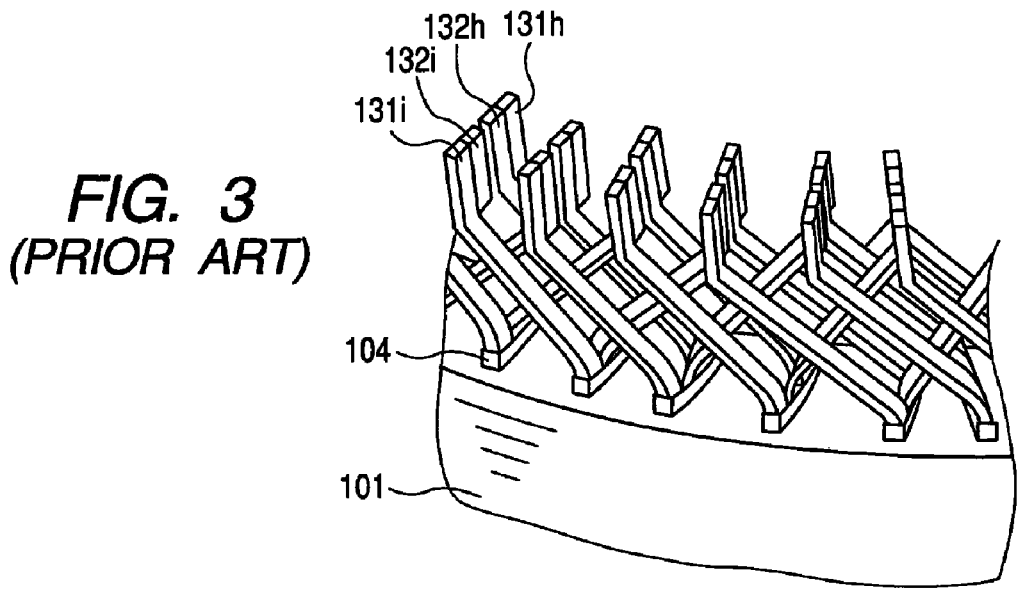
FIG. 3 is a perspective side view of coil ends formed of the segment sets shown in FIG. 2.
Figure 4:
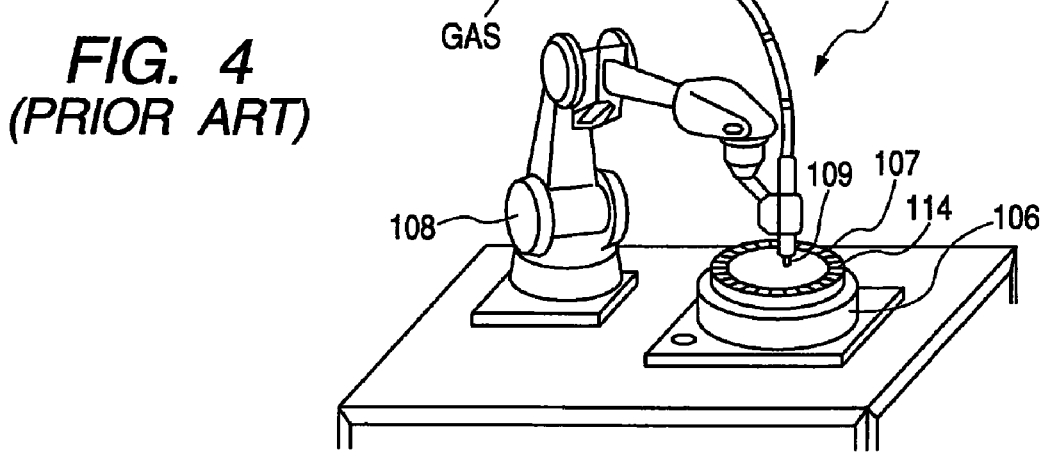
FIG. 4 is a view of a segment connecting device according to a prior art.
Figure 5:
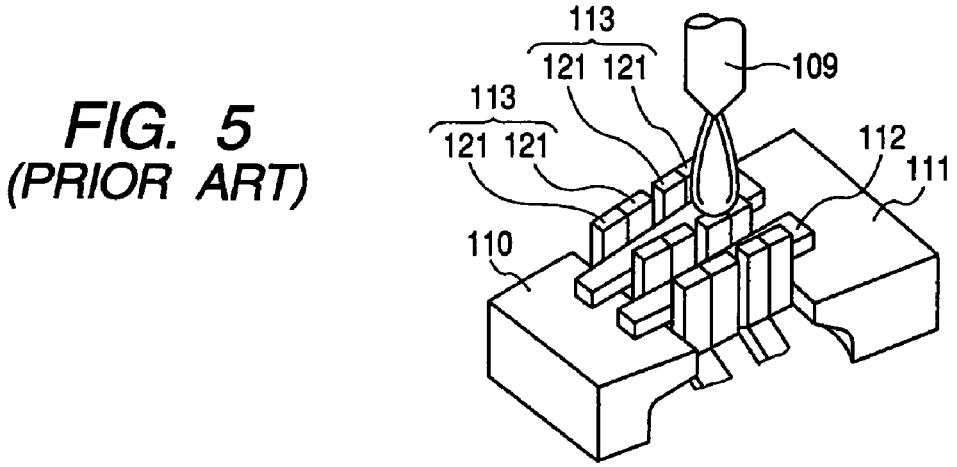
FIG. 5 is a view showing the connection of end portions of segments by using the device shown in FIG. 4.

In the prior art disclosed in the Publication No. 2000-350421, as shown in FIG. 5, the bar-shaped electrodes 112 are disposed to be directly in contact with the end pairs 113 of two rows. Therefore, arc current flows through the end portions 121 of each pair 113 through one bar-shaped electrode 112, and the end pairs 113 of two rows are welded one after another by using the same welding technique.

In contrast, in this embodiment, none of the end pairs 17 of the second inner row are directly in contact with the electrode 20a. To appropriately weld the end pairs 17 of the second inner row one after another without any bar-shaped electrode, the indirectly-earthed arc welding process P62 is performed. The process P62 is described with reference to FIG. 15A and FIG. 15B. FIG. 15A is a side view along the radial direction to show arc current flowing through connection portions 16 of segments 7 forming first and second middle layers in the process P62, and FIG. 15B is a schematic perspective view of a part of the stator seen from the outer side of the core 2 to show the segments 7 welded in the process P62.

As shown in FIG. 15A and FIG. 15B, the connection portions 16 of each end pair 17 forming the innermost row have been already welded together in the process P61. Therefore, each segment 7b inserted into the inner circumferential region of the slot 3 is electrically connected with one segment 7a being in contact with the electrode 20a, so that all segments 7b inserted into the inner circumferential regions of the slots 3 are electrically connected with the electrode 20a. Therefore, an arc welding circuit in the indirect earthing is formed for each end pair 17 of the second inner row.

In the process P62, the torch 22 is moved to be placed over one end pair 17 of the second inner row. When a welding current (shown by arrows in FIG. 15A) is supplied to flow from the torch 22 to the electrode 20a through the end pair 17 of the second inner row and the end pair 17 of the innermost row, arc discharges of the torch 22 are immediately given to the connection portions 16 of the end pair 17 of the second inner row. Therefore, the areas of the end pair 17 of the second inner row are melted while increasing a melted area, and the connection portions 16 in the end pair 17 of the second inner row are appropriately welded together. As a result, the segments 7a and 7b inserted into the inner circumferential regions of the slots 3 are serially connected with one another.

In this indirectly-earthed arc welding, even when the connection portions 16 of the end pair 17 forming the second inner row have different heights in the axial direction, the arc current flows through the connection portions 16. Therefore, the connection portions 16 can reliably be welded together.

After the completion of the process P62, the process P6 is again performed in a basic welding repeating process P7 to weld the end pairs 17 of the segments 7 inserted into the outer circumferential regions of the slots 3. More specifically, in the same manner as in the process P61, the connection portions 16 of each end pair 17 in the outermost row are welded together in the directly-earthed arc welding. Then, in the same manner as in the process P62, the connection portions 16 of each end pair 17 in a second outer row adjacent to the outermost row are welded together in the indirectly-earthed arc welding. Therefore, the segments 7a and 7b inserted into the outer circumferential regions of the slots 3 are serially connected with one another.

Therefore, no electrode is required to push the end pairs 17 of the second inner and outer rows such that the connection portions 16 of each end pair 17 keep in contact with each other, or no electrode being directly in contact with the end pairs 17 of the second inner and outer rows is required. Accordingly, because the end pairs 17 of the second inner and outer rows do not require a direct connection with an electrode to obtain the direct earthing, the welding process P6 can easily and simply be performed.

Further, in the prior art, the end portions 121 are sufficiently heightened to receive the bar-shaped electrodes 112 (see FIG. 5). However, in this embodiment, because no bar-shaped electrode is disposed on the second core end 2b of the core 2, an axial distance between each slanting removal surface 21 and the second axial end 2b of the core 2 can be shortened. Accordingly, the height of the second coil end group 6 in the axial direction can be shortened so as to compactly produce the stator 1.

Moreover, when the torch 22 is moved over the end pairs 17 of each row disposed along the circumferential direction and is moved from one end pair 17 of one row to another end pair 17 of another row, the activation of the TIG welding device is continued so as to continue arc discharges of the torch 22. Therefore, the indirect-earthed arc welding can immediately be started after the direct-earthed arc welding without stopping the arc discharges of the torch 22. Accordingly, the welding work in the processes P6 and P7 can be performed rapidly.

In this embodiment, the winding 2 is composed of the segments 7 having eight layers and four rows. However, the winding 2 may be formed of the segments 7 having N (N is equal to a multiple of 4) layers and N/2 rows by repeating the process P6 by a required number. For example, when a stator winding has the segments 7 formed in twelve layers and six rows, the process P6 is repeated three times. To perform the welding work for each segment set of which the segment 7a is not placed on the innermost or outermost side of the slot, an electrode is placed on ends of the segments 7a and 7b from the upper side of the segments, and a welding current is applied to other ends of the segments to connect segments with one another.

After the completion of the process P7, a lead line extracting process P8 is performed. In this process P8, an end of the serially connected segments 7 in the inner circumferential regions is connected with an end of the serially connected segments 7 in the outer circumferential regions. Therefore, a series of segments 7 having eight layers and four rows is obtained for each phase. Thereafter, ends of the series of segments 7 are lead out from the core 2 for each phase. Therefore, the winding 4 wound on the core 2 is obtained.

Effects in the winding 4 and the method of manufacturing the winding 4 according to this embodiment are now described.

In this embodiment, each slanting portion 13 has the slanting removal surface 21 in addition to the film removed surface 18 such that the slanting removal area 23 containing the surfaces 18 and 21 approaches the end 2b of the core 2. Therefore, a contact area of the electrodes 20a and 20b being in contact with the areas 23 of the slanting portions 13 can be widened by an area of the surfaces 21. In this case, because heat added to the connection portions 16 in the direct-earthed arc welding is dissipated to the atmosphere through the electrodes 20a and 20b, a heat dissipating area can be widened due to the widen contact area. Accordingly, the degradation of the insulation films of the slanting portions 13 caused by the welding heat can be suppressed.

Further, in addition to the film removed surface 18, each slanting portion 13 has the slanting removal surface 21 to widen a contact area with the electrodes 20a and 20b. Therefore, even when a length of the slanting portion 13 in the extending direction is shortened, the same heat dissipating area or contact area as that in the prior art can be obtained. Accordingly, the slanting portions 13 can be shortened while securing the heat dissipating area, and the height of the second coil end group 6 in the axial direction can be shortened.

Moreover, the slanting removal area 23 of each slanting portion 13 is placed to be further away from the end 2b of the core 2 than a crossing area where the oblique portion 14 of the slanting portion 13 and another oblique portion 14 adjacent to each other along the radial direction cross each other through a gap. Therefore, even when a gap between the slanting portions 13 adjacent to each other in the radial direction in the crossing area is narrow such that the slanting portions 13 incidentally come in contact with each other, the portions 13 can be insulated from each other by the insulation films of the portions 13. Accordingly, the slanting portions adjacent to each other in the radial direction can be reliably insulated from each other, and the insulation between the segments 7 having a narrow gap in the radial direction can be improved.

Still further, each segment 7 protruding from one slot of the core 2 is bent and inclined at a predetermined height from the end 2b of the core 2 toward the circumferential direction to form the slanting portion 13 extending along an inclination direction inclined with respect to each of the circumferential and axial directions on the second axial side of the core 2. Therefore, the slanting portion 13 has no standing portion extending along the axial direction. Accordingly, the height of the second coil end group 6 in the axial direction can be further shortened as compared with that in the prior art, and a small-sized stator 1 can be manufactured.

Still further, each film removal portion 15 is thinned to have a width in the radial direction smaller than a width of the oblique portion 14. Accordingly, even when a gap between the segments 7 adjacent to each other in the radial direction is set to be narrow, the electric insulation between two connection portions 16 disposed adjacent to each other in the radial direction without forming any end pair 17 can reliably be obtained. For example, in the welding, the thinning of the portions 15 can prevent two connection portions 16 not forming any end pair 17 from being welded together.

Still further, the slanting removal surface 21 of each oblique portion 14 is formed by slantingly cutting the portion 14 in the radial direction so as to thin the oblique portion 14 in the radial direction. Therefore, two surfaces 21 of each pair of oblique portions 14 adjacent to each other through a gap in the radial direction can be reliably insulated from each other.

Still further, because a volume of each connection portion 16 is reduced by thinning the film removal portion 15, the welding of the connection portions 16 can be rapidly performed at a low welding heat. In this case, because melted metal material of the welded connection portions 16 can be also thinned, the electric insulation between the welded end pairs 17 can reliably secured.

In the manufacturing method of the stator 1, the connection portions 16 of each end pair 17 are welded together in the direct-earthed arc welding and the indirect-earthed arc welding without disposing any electrode between the film removal portions 15 aligned along the circumferential direction. Therefore, the intervals between the end pairs 17 in the circumferential direction and the intervals between the end pairs 17 in the radial direction can be freely set. Accordingly, a wire having a smaller diameter can be used for the segments 7, and the segments 7 can be densely disposed in the core 2. Further, no standing portion extending along the axial direction is required to be in contact with the electrode, so that the film removal portions 15 with the connection portions 16 can be inclined so as to place the connection portions 16 near the second axial end 2b of the core 2. Accordingly, the height of the second coil end group 6 in the axial direction can be shortened.

Further, because the slanting removal surface 21 is disposed on each slanting portion 13 so as to be placed nearer to the end 2b of the core 2 than the film removal portions 15, the electrodes 20a and 20b being in contact with the surface 21 of the slanting portions 13 can be disposed near to the end 2b of the core 2, as compared with a prior art case where electrodes are disposed to be in contact with connection portions. In this case, even when the electrodes 20a and 20b pushes the slanting portions 13 at a comparatively high pushing force, the slanting portions 13 are hardly inclined or bent.

Moreover, each electrode 20 is disposed to be in contact with the slanting removal area 23 wider than the film removal surface 18, so that the electrode 20 has a wider contact area. Accordingly, a large amount of arc current can pass through the connection portions 16 of each end pair 17 in the welding process, and the welding for the end pairs 17 can rapidly be performed.

Still further, even when each slanting portion 13 is shortened, the same contact area as that in the prior art can be obtained. Accordingly, the connection portions 16 of each end pair 17 can reliably be welded together while securing a contact area with the electrode 20a or 20b and a welding quality at the same welding conditions as those in the prior art, and the height of the second coil end group 6 in the axial direction can be shortened.

Still further, in the manufacturing method of the stator 1, the connection portions 16 of each end pair 17 not being directly in contact with the electrode 20a or 20b can be welded together by the indirect-earthed arc welding. Accordingly, a stator with a stator winding having segments of many layers and rows can be manufactured in a simplified process not using any electrodes for the direct-earthed arc welding of the connection portions 16, and the electric insulation and reliability for the stator can be secured.

Still further, in the manufacturing method of the stator 1, because each film removal portion 15 is thinned, a space between the portions 15 of the connection portions 16 disposed adjacent to each other in the radial direction without forming any end pair 17 can be widened. Therefore, it can be prevented to weld the connection portions 16 forming no end pair together. Further, the segments 7 can be wound on the core 2 while setting the segments 7 aligned along the radial direction at shorter intervals. Accordingly, a wire having a smaller diameter can be used for each segment 7.

Still further, because of the thinned connection portions 16, each member of a bending device can be easily placed between the film removal portions 15 adjacent to each other in the radial direction so as to incline the slanting portions 13 toward the circumferential direction without holding the film removal portions 15. Therefore, no standing portions extending along the axial direction are formed in the slanting portions 13. Accordingly, the stator winding 4 having no standing portions can be manufactured, so that the height of the second coil end group 6 in the axial direction can be shortened.

In this embodiment, because the film removal portion 15 of each slanting portion 13 is inclined toward the circumferential direction, the oblique portion 14 of the slanting portion 13 is disposed to be away in the circumferential direction from the connection portion 16 disposed on the end of the film removal portion 15. Accordingly, the height of each film removal portion from the second axial end 2b of the core 2 can be lowered, and the height of the second coil end group 6 in the axial direction can further be shortened.

Modifications

Figure 16:
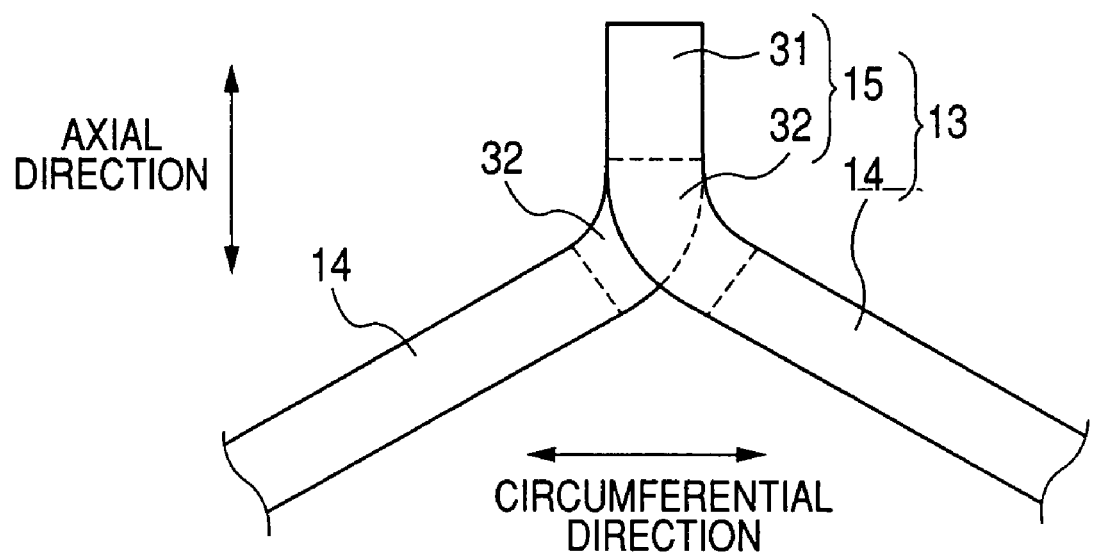
FIG. 16 is a schematic side view of a film removal portion according to a modification of the embodiment.

FIG. 16 is a schematic side view seen from an outer side of the core 2 to show a connection portion disposed on an end of one film removal portion 15 according to a modification of the embodiment.

In this embodiment, each film removal portion 15 with the connection portions 16 extends along the inclination direction between the circumferential and axial directions. However, as shown in FIG. 16, each film removal portion 15 in a part of the film removal portion 15 may have a risen connection portion 31 and a curved portion 32. The curved portion 32 extends from the corresponding oblique portion 14 and is curved in a circular arc shape toward the axial direction so as to be away from the end 2b of the core 2 (see FIG. 6). The risen connection portion 31 extends from the portion 32 toward the axial direction. The portion 31 acts as one connection portion 16 and forms one end pair 17 with another portion 31.

Because each slanting portion 13 has the slanting removal surface 21 in addition to the surface 18, the electrodes 20a and 20b are disposed to be in contact with the surfaces 18 and 21 of the slanting portions 13. Therefore, even when a length of the portion 31 is shortened, the electrodes being in contact with the surfaces 21 can have a sufficient contact area and a sufficient heat dissipation area. Accordingly, the height of the portion 31 in the axial direction can be shortened, so that the height of the second coil end group 6 in the axial direction can be shortened.

Further, each slanting portion 13 in a part of the slanting portions 13 may have no film removal portion. With this structure, the number of film removal portions 15 of the other slanting portions 13 arranged on the end side of the core 2 is reduced. Therefore, the portions 15 can be arranged sparsely, so that the height of the portions 15 in the axial direction can be lowered.

Moreover, each of the oblique portions 14 of the segments 7a forming the innermost and outermost layers may have a length in the extending direction (i.e., inclination direction) of the oblique portion 14 larger than a length of any one of the oblique portions 14 of the segments 7a forming the middle layers. For example, the axial height of the oblique portions 14 forming the innermost and outermost layers is set to be larger than that of the oblique portions 14 forming the middle layers, and the position of first slanting removal surfaces 21 of the oblique portions 14 forming the middle layers is differentiated in the axial direction from second slanting removal surfaces 21 of the oblique portions 14 forming the innermost and outermost layers. With this structure, even when the first slanting removal surfaces 21 are densely arranged in a narrow space, the first slanting removal surfaces 21 can reliably be insulated from the second slanting removal surfaces 21. Accordingly, the electric insulation of the oblique portions 14 adjacent to one another along the radial direction can reliably be secured.

Furthermore, each of the electrodes 20 and 20b may be arbitrarily formed on condition that each electrode has a shape fitting the slanting removal surfaces 21. In this case, each electrode can reliably be in contact with the whole surfaces 21 so as to give a sufficient arc current to the segments 7 and to remove the welding heat from the segments 7.

Still further, in the welding processes P6 and P7, the end pairs 17 of the rows are successively welded. However, an arc current output from the torch 22 may be stopped each time the end pairs 17 of one row are welded. In this case, after the torch 22 is moved to the end pairs 17 of another row, an arc current is output from the torch 22 to the end pairs 17.

Still further, the end pairs 17 of the segments 7 inserted into the outer circumferential regions of the slots 3 may be first welded in the welding process P6, and then the end pairs 17 of the segments 7 inserted into the inner circumferential regions of the slots 3 may be welded in the welding process P7. In this modification, after the direct-earthed arc welding is performed for the end pairs 17 of each region, the indirect-earthed arc welding is performed for the end pairs 17 of the region.

Still further, the TIG arc welding is performed in the welding processes P6 and P7. However, an arc welding using carbon dioxide ($CO_2$) gas or an MIG (metal inert gas) arc welding may be performed in the welding processes P6 and P7. Further, a laser welding may be performed in the welding processes P6 and P7.

In this embodiment, each segment 7 is formed in a U shape so as to have two inserted portions 11 received in two slots 3. However, each segment 7 substantially formed in a straight shape (I shape) may be inserted only in a single slot 3 to form the connection portions 16 aligned along the circumferential direction and the radial direction in eight layers on each of two axial ends of the core 2. In this case, the end pairs 17 having four rows are formed on each of the axial ends of the core 2. To serially connect the I-shaped segments, for example, ends of the segments in each pair on one end side of the core are electrically connected to substantially form a plurality of U-shaped segments.

Further, each segment 7 is made of a straight angle wire formed in a rectangular shape in section. However, each segment 7 may be made of a round bar formed in a circular or elliptical shape in section. In this case, each end portion of the segments 7 is thinned so as to form one connection portion with a flat surface, and the connection portions of each pair of segments 7a and 7b adjacent to each other are connected with each other through the flat surfaces of the connection portions.

Moreover, when the segments 7 inserted into the slots 3 form eight layers or more, the indirect-earthed arc welding is performed for the segments 7 to serially connect the segments 7 one another. However, when the segments 7 inserted into the slots 3 form four layers, it is not required to perform the indirect-earthed arc welding for the segments 7. In this case, only the direct-earthed arc welding is performed for the segments 7 to serially connect the segments 7 one another.

What is claimed is:

1. A method of manufacturing a stator of an electric rotating machine, comprising the steps of:

preparing a stator core with a plurality of slots disposed along a circumferential direction of the stator core such that each of the slots extends along an axial direction of the stator core;

preparing a plurality of conductor segments covered with insulation films, respectively;

removing the insulating film of each conductor segment from each of ends of the conductor segment to form a film removal portion having a film removed surface covered with no insulating film at each end of the conductor segment and to form an oblique portion extending from the film removal portion and having a slanting removal surface;

disposing a plurality of inserted portions of the conductor segments in the slots of the stator core such that other portions of the conductor segments protrude from the slots and such that the conductor segments form a plurality of layers aligned with one another along a radial direction of the stator core in each of the slots;

bending the other portions of the conductor segments toward the circumferential direction to form a slanting portion composed of one film removal portion and one oblique portion from each of the other portions such that two connection portions placed at ends of the film removal portions in each pair are adjacent to each other as an end pair along the radial direction;

causing an electrode to make contact with the slanting removal surfaces of the oblique portions of the conductor segments in the innermost and outermost layers of the slots; and welding the connection portions of each end pair together by supplying an arc current to the connection portions and by discharging the arc current from the electrode through the slanting removal surfaces so as to serially connect the conductor segments with one another, wherein the step of welding the connection portions comprises:

causing the electrode to make the connection portions of each first end pair, one of which extends from the oblique portion being in contact with the electrode, come in contact with each other;

performing a direct-earthed arc welding to weld the connection portions of the first end pair together and to indirectly connect the connection portions of each second end pair, which extend from the respective oblique portions not being in contact with the electrode, with the electrode through two of the connection portions of the first end pairs; and performing an indirect-earthed arc welding to weld the connection portions of the second end pair together.

2. The method according to claim 1, wherein the step of preparing the conductor segments includes
preparing a plurality of U-shaped first conductor segments and a plurality of U-shaped second conductor segments, and the step of disposing the inserted portions of the conductor segments includes
disposing two inserted portions of each first conductor segment into respective two slots away from each other by one magnetic pole pitch to form the innermost or outermost layer in one slot and to form a first middle layer away from the innermost or outermost layer by three layers in the other slot; and
disposing two inserted portions of each second conductor segment into respective two slots away from each other by one magnetic pole pitch to form a second middle layer away from the innermost or outermost layer by two layers in one slot and to form a third middle layer adjacent to the innermost or outermost layer in the other slot.

3. A method of manufacturing a stator of an electric rotating machine, comprising the steps of:
preparing a stator core with a plurality of slots disposed along a circumferential direction of the stator core such that each of the slots extends along an axial direction of the stator core;
preparing a plurality of conductor segments covered with insulation films, respectively;
removing the insulating film of each conductor segment from each of ends of the conductor segment to form a film removal portion having a film removed surface covered with no insulating film at each end of the conductor segment and to form an oblique portion extending from the film removal portion and having a slanting removal surface;
disposing a plurality of inserted portions of the conductor segments in the slots of the stator core such that other portions of the conductor segments protrude from the slots and such that the conductor segments form a plurality of layers aligned with one another along a radial direction of the stator core in each of the slots;
bending the other portions of the conductor segments toward the circumferential direction to form a slanting portion composed of one film removal portion and one oblique portion from each of the other portions such that two connection portions placed at ends of the film removal portions in each pair are adjacent to each other as an end pair along the radial direction;
causing an electrode to make contact with the slanting removal surfaces of the oblique portions of the conductor segments in the innermost and outermost layers of the slots; and
welding the connection portions of each end pair together by supplying an arc current to the connection portions and by discharging the arc current from the electrode through the slanting removal surfaces so as to serially connect the conductor segments with one another, wherein the step of welding the connection portions comprises:
causing the electrode to make the connection portions of each first end pair, one of which extends from the oblique portion being in contact with the electrode, come in contact with each other;
performing a direct-earthed arc welding to weld the connection portions of the first end pair together; and
performing an indirect-earthed arc welding to weld the connection portions of each second end pair, which extend from the respective oblique portions not being in contact with the electrode, together.

* * * * *